(12) United States Patent
Nemoto et al.

(10) Patent No.: US 9,501,326 B2
(45) Date of Patent: Nov. 22, 2016

(54) PROCESSING CONTROL SYSTEM, PROCESSING CONTROL METHOD, AND PROCESSING CONTROL PROGRAM

(71) Applicant: HITACHI, LTD., Tokyo (JP)

(72) Inventors: Naokazu Nemoto, Tokyo (JP); Kunihiko Toumura, Tokyo (JP); (Continued)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/772,723

(22) PCT Filed: Mar. 4, 2014

(86) PCT No.: PCT/JP2014/055475
§ 371 (c)(1),
(2) Date: Sep. 3, 2015

(87) PCT Pub. No.: WO2014/148247
PCT Pub. Date: Sep. 25, 2014

(65) Prior Publication Data
US 2016/0011909 A1  Jan. 14, 2016

(30) Foreign Application Priority Data

Mar. 19, 2013 (JP) .................................. 2013-056844

(51) Int. Cl.
*G06F 9/46* (2006.01)
*G06F 9/50* (2006.01)
(Continued)

(52) U.S. Cl.
CPC .......... *G06F 9/5044* (2013.01); *G06F 11/184* (2013.01); *G06F 11/3419* (2013.01); *G06F 11/3433* (2013.01); *G06F 11/1675* (2013.01)

(58) Field of Classification Search
None
See application file for complete search history.

(56) References Cited

U.S. PATENT DOCUMENTS

2004/0205108 A1\* 10/2004 Tanaka ................. G06F 9/4881
709/201
2006/0143619 A1\* 6/2006 Galchev ............... G06F 9/5033
719/315
(Continued)

FOREIGN PATENT DOCUMENTS

JP       07-306794 A     11/1995
JP       2008-152618 A    7/2008
(Continued)

OTHER PUBLICATIONS

Office Action for Japanese Patent Application No. JP2015-506685 dated Aug. 16, 2016.

*Primary Examiner* — Sisley Kim
(74) *Attorney, Agent, or Firm* — Volpe and Koenig, P.C.

(57) ABSTRACT

A load balancing system for performing stable processing and high reliability includes a management device which acquires time information indicating the time required in past processing on each of n processing devices, estimates a required time required for each processing devices to process processing target information based on the time information thereby obtaining an estimated time, and transmits estimated time information indicating a relationship between the estimated time and the processing device to a load balancing device. The load balancing device determines m (1<m<n) processing devices that process the processing target information based on the estimated time information and transmits the processing target information to the designated processing devices. A processing result determination device receives results from the processing devices, estimates a true value from the results to obtain an estimated value, and transmits the estimated value to a subsequent-stage processing device that processes the estimated value.

18 Claims, 38 Drawing Sheets

(72) Inventors: Yukiko Takeda, Tokyo (JP); Naoki Haraguchi, Tokyo (JP)

(51) Int. Cl.
*G06F 11/18* (2006.01)
*G06F 11/34* (2006.01)
*G06F 11/16* (2006.01)

(56) References Cited

U.S. PATENT DOCUMENTS

| | | | |
|---|---|---|---|
| 2006/0212873 A1 | 9/2006 | Takahisa | |
| 2007/0220516 A1* | 9/2007 | Ishiguro | G06F 9/505 |
| | | | 718/101 |
| 2008/0148272 A1 | 6/2008 | Yoshida | |
| 2009/0282413 A1* | 11/2009 | Cialini | G06F 9/4881 |
| | | | 718/102 |
| 2011/0041136 A1* | 2/2011 | Messier | G06F 9/5066 |
| | | | 718/105 |
| 2012/0084788 A1 | 4/2012 | Sakamoto | |
| 2012/0203888 A1* | 8/2012 | Balakrishnan | G06F 9/505 |
| | | | 709/224 |

FOREIGN PATENT DOCUMENTS

| | | |
|---|---|---|
| JP | 2009-230581 | 10/2009 |
| JP | 2009-230581 A | 10/2009 |

* cited by examiner

Fig. 7

| Event type | Distribution order | Updated time | Distribution number |
|---|---|---|---|
| Fixed time type | Analysis server a<br>Analysis server b<br>Analysis server c<br>Analysis server d<br>Analysis server e | H1:M2:S3.111 | 5 |
| ... | ... | ... | ... |

Distribution management table

Fig. 8

| Event type | Protocol | Header |
|---|---|---|
| Realtime type | ST | X1 |
| Fixed time type | ST | X2 |
| ... | ... | ... |

Event type identification table

Fig. 9

| Class | Address | Mask value |
|---|---|---|
| Analysis server a | 400.0.0.1 | 255.255.255.0 |
| Analysis server b | 400.0.0.2 | 255.255.255.0 |
| ... | ... | ... |

Communication management table

Requested time table

Fig. 11

| Event type 9211 | Analysis server 9212 | Analysis logic 9213 | Analysis time 9214 |
|---|---|---|---|
| Realtime type | Analysis server a | R1 | 123ms |
| Realtime type | Analysis server b | R2 | 234ms |
| ... | ... | ... | ... |

921

Analysis logic management table

Fig. 12

| Class | Address | Mask value |
|---|---|---|
| Distribution device a | 300.0.0.1 | 255.255.255.0 |
| Analysis server a | 400.0.0.1 | 255.255.255.0 |
| Determination device a | 500.0.0.1 | 255.255.255.0 |
| ... | ... | ... |

Connection destination management table

Fig. 13

| Analysis server | Reception source | Event type | Event class | Quotation time | Updated time |
|---|---|---|---|---|---|
| Analysis server a | Distribution | Realtime type | A | 0.543sec | H1:M2:S3.111 |
| Analysis server b | Distribution | Realtime type | B | 0.123sec | H1:M2:S3.202 |
| Analysis server a | Distribution | Realtime type | B | 0.345sec | H1:M2:S3.303 |
| Analysis server b | Determination | Realtime type | B | --- | H1:M2:S3.404 |
| ... | ... | ... | ... | ... | ... |

Time management table

Fig. 14

| Analysis server | Average quotation time | Updated time | Total time | Counter | Analysis logic |
|---|---|---|---|---|---|
| Analysis server a | 0.543sec | H1:M2:S3.100 | 1234sec | 9999 | R1 |
| Analysis server b | 0.123sec | H1:M2:S3.200 | 1244sec | 10000 | Z1 |
| Analysis server c | 0.345sec | H1:M2:S3.103 | 1321sec | 15000 | Z1 |
| ... | ... | ... | ... | ... | ... |

Statistical time management table

Fig. 15

| Event type | Analysis logic |
|---|---|
| Realtime type | R1 |
| Fixed time type | Z1 |
| ... | ... |

Logic management table

Fig. 16

| No. | Analysis logic | Event content | Received time |
|-----|----------------|---------------|---------------|
| 1 | R1 | XXXXX | H1:M2:S3.0100 |
| 2 | Z1 | YYYYY | H1:M2:S3.2000 |
| 3 | Z1 | ZZZZZ | H1:M2:S3.1030 |
| ... | ... | ... | ... |

Queue management table

Fig. 17

| Class | Address | Mask value |
|---|---|---|
| Determination device a | 500.0.0.1 | 255.255.255.0 |
| Determination device b | 500.0.0.2 | 255.255.255.0 |
| ... | ... | ... |

Connection destination management table

Simple distribution rule

Fig. 19

| Class | Address | Mask value |
|---|---|---|
| Distribution device a | 300.0.0.1 | 255.255.255.0 |
| Distribution device b | 300.0.0.2 | 255.255.255.0 |
| ... | ... | ... |

Simple distribution destination table

Fig. 20

| | 12201 | 12202 | 12203 | 12204 | 12205 | 12206 | 723 |
|---|---|---|---|---|---|---|---|
| | No. | Event type | Analysis server | Event class | Analysis value | Received time | |
| | 1 | Realtime type | Analysis server a | A | XXXA | H1:M2:S3.0100 | |
| | 2 | Fixed time type | Analysis server a | B | ZZZA | H1:M2:S3.2000 | |
| | 3 | Realtime type | Analysis server b | A | XXXA | H1:M2:S3.1030 | |
| | ... | ... | ... | | ... | ... | |

Analysis result management table

Fig. 21

| Event type | Distribution number |
|---|---|
| Realtime type | 3 |
| Fixed time type | 5 |
| ... | ... |

Distribution number management table

Fig. 22

| Class | Address | Mask value |
|---|---|---|
| Management server | 10.0.0.1 | 255.255.255.0 |
| AP server a | 600.0.0.1 | 255.255.255.0 |
| AP server b | 600.0.0.2 | 255.255.255.0 |
| ... | ... | ... |

Communication management table

Fig. 35

| Analysis server | Queue length | Quotation time | Updated time |
|---|---|---|---|
| Analysis server a | 8 | 1.2345sec | H1:M2:S3.111 |
| Analysis server b | 4 | 0.12345sec | H1:M2:S3.202 |
| ... | ... | ... | ... |

Analysis server status management table

Fig. 37

| Session ID | Distribution destination | Event type | Event class |
|---|---|---|---|
| S1 | Analysis server a<br>Analysis server b<br>Analysis server c | Realtime type | A |
| S2 | Analysis server a<br>Analysis server b<br>Analysis server d | Realtime type | B |
| ... | ... | ... | ... |

Session management table

PROCESSING CONTROL SYSTEM, PROCESSING CONTROL METHOD, AND PROCESSING CONTROL PROGRAM

CROSS-REFERENCE TO RELATED APPLICATIONS

The present application claims the benefit of priority to Japanese Patent Application No. 2013-056844 filed on Mar. 19, 2013, the entire contents of which are hereby incorporated by reference.

TECHNICAL FIELD

The present invention relates to a technique of distributing processes to a plurality of computers.

BACKGROUND ART

Recently, an attempt to parse (analyze) a large amount of data (referred to as big data) represented by logs, sensor information, and the like output from various apparatuses and sensors to obtain an idea (information) helpful to businesses has been made. In this analysis, a technique of analyzing a large amount of data stored in a database or the like at a specific point in time with batch processing is known.

Moreover, a complex event processing (CEP) technique of analyzing algorithm transactions in banks and the like on a realtime basis to acquire the analysis results on a realtime basis is also known. The batch processing involves processing a wide range of data (in units of several days to several years). On the other hand, the CEP technique involves processing a range of latest data (in units of several minutes). From such a difference in their nature, the batch processing is used for analyzing trends or the like whereas the CEP technique is used for invalid value detection, realtime charging control, and the like based on access logs and the like.

When an analysis server in a system that uses the CEP technique analyzes a large amount of data, it may be difficult to process all of the data in realtime since there is a limit in the processing performance of the analysis server. If the amount of data processed by the CEP technique is particularly large, the performance may deteriorate due to a delay in the data analysis process in the CEP technique.

To solve such a problem, a technique of providing a plurality of analysis servers and distributing event processing according to a relevance between events executed as CEP in the analysis servers to prevent performance deterioration is known (for example, see PTL 1, paragraphs 0039 and 0041).

The scheme disclosed in PTL 1 is a system in which an analysis server having a low processing load is selected and caused to execute processing in order to prevent performance deterioration.

Similarly, a technique of distributing load between a plurality of computers has also been considered (PTL 2). In this technique, a plurality of computers expresses the loads thereof in a usage rate of queue and the request of a client is transmitted to a computer having the lowest usage rate to prevent concentration of load.

In general, as a method for preventing a system performance from limiting the processing performance of a server, a method of improving hardware performance and a method of distributing processes as in Patent Literature mentioned above are used. The former method has a problem in that it involves service suspension during updating of hardware. Thus, data center operators and the like often use the latter method (scale-out) to improve the performance because this method can cope up with an increase in a communication traffic without suspending services. When the performance is improved according to the scale-out, how processes are to be distributed to a plurality of servers is an issue.

Scale-out is generally triggered by the lack of overall processing performance of a system. The hardware processing performance of servers or computers has been improved day by day. Thus, it is practically difficult to introduce servers during scale-out so that the introduced server has the same hardware processing performance as that of a server introduced during construction of a system. In a system constructed with a plurality of servers having different processing performance, when a round-robin method of allocating process requests sequentially is used, for example, since the servers have different specifications, a difference occurs in the balance of loads of the servers and the time required for processing a request is different from one server to another.

On the other hand, in a system including various constituent elements such as one or more servers and one or more networks connecting the servers, when a fault, a failure, or the like occurs in these constituent elements, the system may be suspended or may provide incorrect results. Thus, the reliability of the system may decrease.

To solve this problem, a redundant scheme is known as one of the schemes for improving reliability (that is, providing fault tolerance). In a redundant scheme, a plurality of identical systems is provided and all systems execute the same process in parallel so that, even when a fault occurs in a certain system, the other systems continue operating. In this way, reliability is secured. Here, a scheme in which, when the same result is not attained even when the plurality of systems performs the same processing due to a fault (for example, a computation error due to an internal fault of a CPU), a result that is considered to be correct is output according to the majority decision is known.

For example, PTL 3 discloses a system which receives a processing request and transmits the result obtained by a computer that processes the request. In this system, the same processing request is transmitted to all of the plurality of computers, the processing results are received from the plurality of computers, the plurality of received processing results are compared, and a correct processing result is output.

By using such a scheme, it is possible to prevent different results from being output due to a fault or a failure in a computer and a difference in the software version. Thus, the system can operate with improved reliability.

CITATION LIST

Patent Literature

[PTL 1]
  US Patent Application Publication No. US2012/084788
[PTL 2]
  US Patent Application Publication No. US2006/212873
[PTL 3]
  Japanese Patent Application Publication No. H7-306794

SUMMARY OF INVENTION

Technical Problem

According to the technique of distributing event processing disclosed in PTL 1, events having high relevance are distributed to a specific analysis server based on a load. Thus, when the amount of data to be analyzed is particularly large, the load of the analysis server may reach the upper limit of processing performance and it is difficult to complete the analysis in a predetermined period.

Moreover, in the technique of transmitting a request to a plurality of computers disclosed in PTL 2, it is difficult to execute load balancing efficiently. Moreover, when a plurality of computers having different specifications process the processing request, a difference occurs in the balance of loads of the plurality of computers and the time required for processing the request is different from one computer to another.

Further, the schemes of PTL 1 and PTL 2 just select one server or computer having a low processing load and do not take the possibility of the occurrence of a fault into consideration and thus do not provide fault tolerance.

In the technique disclosed in PTL 3, processing is executed in all of the plurality of computers in parallel. In such a scheme, the upper limit of processing performance of one computer rules the overall performance of the system. Thus, when the technique disclosed in PTL 3 is used in a system that parses and analyzes a large amount of information like big data, for example, the system through put may decrease with an increase in the processing amount.

Therefore, it is desirable to provide a load balancing technique capable of processing requests stably while providing high reliability without decreasing the throughput even when a processing amount increases.

Solution to Problem

In order to solve the problems, the present DESCRIPTION provides a technique of selecting m ($1<m<n$) computers (for example, analysis servers) by taking the load on n (n is 3 or more) computers (for example, analysis servers) and the performance to process requested processing into consideration and processing a plurality of processing results obtained by the selected computers (for example, analysis servers) according to a predetermined method to obtain the most probable result.

Based on the disclosed technique, the requested processing can be processed by a plurality of computers, and as a result, it is possible to shorten the processing time and to reduce the load on the system.

Moreover, by selecting a plurality of some computers (for example, analysis servers) rather than all computers, it is possible to suppress the consumption of resources such as power consumption required for the entire system.

A processing system according to a more specific aspect includes the following configuration.

The system includes a load balancing device connected to n (n is 3 or more) processing devices; a processing result determination device connected to the n processing devices; and a management device connected to the load balancing device and the processing result determination device. The management device acquires time information indicating the time required in past processing on each of the n processing devices, estimates a required time required for each of the n processing devices to process processing target information based on the time information to obtain an estimated time, and transmits estimated time information indicating a relationship between the estimated time and the processing device to the load balancing device.

The load balancing device determines m ($1<m<n$) processing devices that process the processing target information based on the estimated time information and transmits the processing target information to the determined m designated processing devices. Each of the m designated processing devices processes the processing target information to calculate a processing result and transmits the processing result to the processing result determination device. The processing result determination device receives m processing results from the m designated processing devices respectively, estimates a true value from the m processing results according to a predetermined method to obtain an estimated value, and transmits the estimated value to a subsequent-stage processing device that processes the estimated value.

According to another aspect of the present invention, there is provided a load balancing program for allowing a computer of a load balancing device connected to n (n is 3 or more) processing devices to execute a process. The process includes, when a management device connected to the load balancing device acquires time information indicating the time required in past processing on each of the n processing devices, estimates a required time required for each of the n processing devices to process processing target information based on the time information to obtain an estimated time, and transmits estimated time information indicating a relationship between the estimated time and the processing device to the load balancing device, allowing the computer to determine m ($1<m<n$) processing devices that process the processing target information based on the estimated time information; and allowing the computer to transmit the processing target information to the determined m designated processing devices. Each of the m designated processing devices processes the processing target information to calculate a processing result and transmits the processing result to the processing result determination device. The processing result determination device receives m processing results from the m designated processing devices respectively, estimates a true value from the m processing results according to a predetermined method to obtain an estimated value, and transmits the estimated value to a subsequent-stage processing device that processes the estimated value.

According to another aspect of the present invention, there is provided a processing result determination program for allowing a computer of a processing result determination device connected to n (n is 3 or more) processing devices to execute a process. The process includes, when a management device connected to the processing result determination device acquires time information indicating the time required in past processing on each of the n processing devices, estimates a required time required for each of the n processing devices to process processing target information based on the time information to obtain an estimated time, and transmits estimated time information indicating a relationship between the estimated time and the processing device to the management device, the n processing devices, and the load balancing device connected to the processing result determination device, the load balancing device determines m ($1<m<n$) processing devices that process the processing target information based on the estimated time information and transmits the processing target information to the determined m designated processing devices, and each of the m designated processing devices processes the processing target information to calculate a processing result and transmits the processing result to the processing result determination device, allowing the processing result determination device to receive m processing results from the m designated processing devices respectively, allowing the computer to estimate a true value from the m processing results according to a predetermined method to obtain an estimated value, and allowing the computer to transmit the estimated value to a subsequent-stage processing device that processes the estimated value.

According to the aspects, in a system in which low-reliability servers and low-reliability software components are installed, it is possible to distribute processes so that a processing result is output within a requested time.

According to an aspect of the present invention, it is possible to obtain a probable result according to the majority decision without decreasing the reliability of servers or being affected by suspension or replacement of hardware or software components.

According to another aspect of the present invention, an administrator may apply weighting to the processing results of certain servers to obtain the true result according to the majority decision based on the weighted processing results as a scheme for estimating a true result from a plurality of processing results of a plurality of servers.

According to still another aspect of the present invention, when determining the processing results a plurality of servers, the processing results of certain servers may be disregarded and the true result may be obtained according to the majority decision based on the remaining processing results as a scheme for estimating a true result from a plurality of processing results of a plurality of servers.

According to still another aspect of the present invention, a scheme of obtaining an estimated value using a probability distribution or an average value when the processing result is output as a multi-valued result and a scheme of making determination even when the number of determination results is an even number are employed as the scheme for estimating a true result from a plurality of processing results of a plurality of servers. Thus, it is possible to obtain a probable estimated value.

Advantageous Effects of Invention

According to the disclosure, it is possible to provide a load balancing technique capable of performing processing stably while providing high reliability.

BRIEF DESCRIPTION OF DRAWINGS

FIG. 7 illustrates a distribution management table 121 stored in the distribution device 10.

FIG. 8 illustrates an event type identification table 122 stored in the distribution device 10.

FIG. 9 illustrates a communication management table 123 stored in the distribution device 10.

FIG. 11 illustrates an analysis logic management table 921 stored in the management server 9.

FIG. 12 illustrates a connection destination management table 922 stored in the management server 9.

FIG. 13 illustrates a time management table 923 stored in the management server 9.

FIG. 14 illustrates a statistical time management table 924 stored in the management server 9.

FIG. 15 illustrates a logic management table 1120 stored in the analysis server 11.

FIG. 16 illustrates a queue management table 1121 stored in the analysis server 11.

FIG. 17 illustrates a connection destination management table 1123 stored in the analysis server 11.

FIG. 19 illustrates a simple distribution destination table 821 stored in the log output server 8.

FIG. 20 illustrates an analysis result management table 720 stored in the determination device 12.

FIG. 21 illustrates a distribution number management table 721 stored in the management server 9 and the determination device 12.

FIG. 22 illustrates a communication management table 722 stored in the determination device 12.

FIG. 35 illustrates an analysis server status management table 925 stored in the management server 9 of the second embodiment.

FIG. 37 illustrates a session management table 124 stored in the distribution device 10 of the third embodiment.

DESCRIPTION OF EMBODIMENTS

Figure 1:
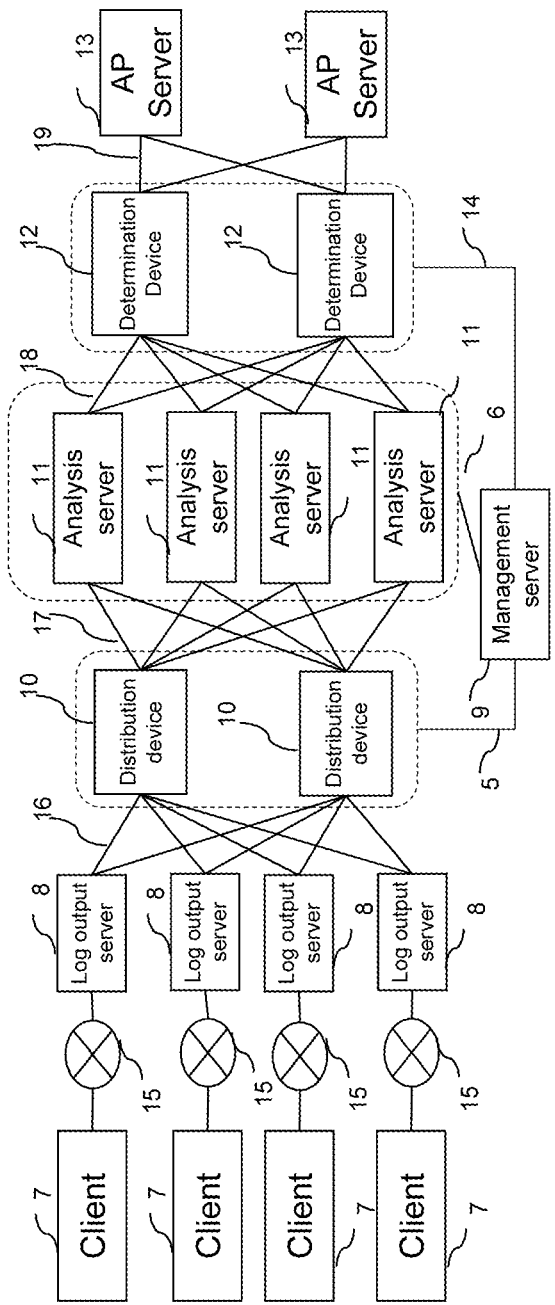
FIG. 1 illustrates a configuration of a computer system used in respective embodiments.

Hereinafter, embodiments of the present invention will be described with reference to the drawings.

[First Embodiment]

The terms used in expressions of an aspect of the present invention will be described. Each of n processing devices corresponds to an analysis device, an analysis server 11, or the like. Processing corresponds to analysis or the like. A load balancing device corresponds to a distribution device 10 or the like. A processing result determination device corresponds to an analysis result determination device, a determination device 12, or the like. A management device corresponds to a management server 9 or the like. A subsequent-stage processing device corresponds to a processing device, an AP server 13, or the like that processes an estimated value. Processing target information corresponds to analysis target information, an event, or the like. Each of m designated processing devices corresponds to a specific analysis device, a distribution destination analysis server 11, or the like. Time information corresponds to a time management table 923, a quotation time, or the like. An estimated time corresponds to a statistical time management table 924, a quotation time, an average quotation time, or the like. Estimated time information corresponds to queue statistics information, a distribution destination response, or the like. A load balancing program corresponds to a program of the distribution device 10 or the like. A processing result determination program corresponds to a program of the determination device 12 or the like. A communication device corresponds to a log output server 8 or the like. A processing control program corresponds to a program of the management server 9 or the like. An upper limit corresponds to a requested time or the like.

Hereinafter, a configuration of a computer system according to an embodiment of the present invention will be described.

FIG. 1 illustrates a configuration of a computer system according to an embodiment of the present invention.

The computer system of the present embodiment includes a plurality of clients 7, a plurality of log output servers 8, a management server 9, a plurality of distribution devices 10, a plurality of analysis servers 11, a plurality of determination devices 12, and a plurality of application (AP) servers 13. Only one log output server 8, only one distribution device 10, only one determination device 12, and only one AP server 13 may be provided. Moreover, the client 7 may not be provided.

The client 7 is connected to the log output server 8 via a network 15. The log output server 8 is connected to the plurality of distribution devices 10 via a network 16. The distribution device 10 is connected to the plurality of analysis servers 11 via a network 17. The analysis server 11 is connected to the plurality of determination devices 12 via a network 18. The determination device 12 is connected to the plurality of AP servers 13 via a network 19. Moreover, the management server 9 is connected to the plurality of distribution devices 10 via a network 5. The management server 9 is connected to the plurality of analysis servers 11 via a network 6. The management server 9 is connected to the plurality of determination devices 12 via a network 14. The management server 9 may not be connected to the plurality of analysis servers 11.

In the present embodiment, although an example in which the distribution device 10 and the determination device 12 are provided as different hardware components is illustrated, the distribution device 10 and the determination device 12 may be provided in the same hardware component. Moreover, the distribution device 10, the analysis server 11, and the determination device 12 may be provided in the same hardware component. In the present embodiment, although an example in which the management server 9 is provided as a hardware component different from that of the distribution device 10, the analysis server 11, and the determination device 12 is illustrated, the management server 9 may be provided in any one of the distribution device 10, the analysis server 11, and the determination device 12. Moreover, in the present embodiment, although the management server 9 is provided as one computer, the management server 9 may be provided as a computer system including the plurality of management servers 9. However, in this case, information needs to be shared and synchronized between the plurality of management servers 9.

The client 7 communicates with the log output server 8. The log output server 8 generates a log indicating the content of the communication with the client 7, selects a destination among the plurality of distribution devices 10 according to the content of an event in the log, and outputs the event to the selected distribution device 10. The distribution device 10 having received the event selects a destination among the plurality of analysis servers 11 according to the content of the event and transmits the event to the selected analysis server 11. The analysis server 11 having received the event analyzes the event to obtain an analysis value and transmits analysis result information including the analysis value to the determination device 12. The determination device 12 having received a plurality of analysis values estimates a true value of the plurality of analysis values to obtain an estimated value and transmits the estimated value to the AP server 13 having requested the analysis result as a final analysis result. The AP server 13 having received the estimated value executes an AP that uses the estimated value. With the configuration of such a computer system, an analyzing process can be distributed to a plurality of analysis servers 11.

A case in which this computer system is used in a mobile communication system will be described. In this case, the client 7 corresponds to a communication terminal device such as a mobile phone or a smartphone used by users. The log output server 8 corresponds to a base station, a gateway (GW), and the like and outputs the communication log of the communication terminal device as an event. The analysis server 11 analyzes a communication traffic, a paid contents usage rate, and the like for each user based on an event. The AP of the AP server 13 performs a charging process of processing charging on users according to the communication traffic and the paid contents usage of each communication terminal device, a bandwidth control process of controlling the bandwidth of a communication terminal device according to the communication traffic of the communication terminal device, and other processes.

The log output server 8 may be a camera, a sensor, and the like. In this case, the log output server 8 transmits detected information to the distribution device 10 as an event. In this case, the computer system may not include the client 7.

In addition to the above systems, such a computer system may be applied to a network system that communicates data between a server and a client, such as a world wide web (WWW), an email system, or a data center.

In the following description, a system that includes the management server 9, the distribution device 10, and the determination device 12 is sometimes referred to as analysis control system. Moreover, a system that includes an analysis control system and a plurality of analysis servers 11 is sometimes referred to as an analysis system.

Figure 2:
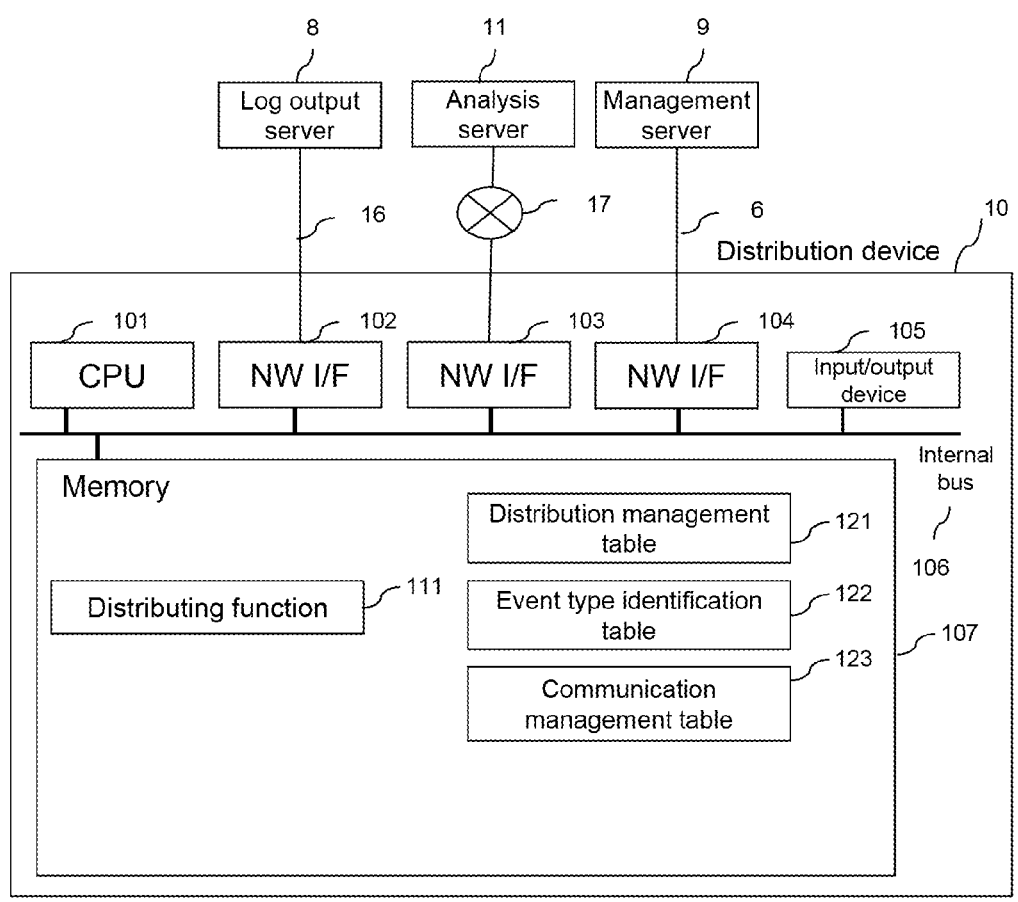
FIG. 2 illustrates a configuration of a distribution device 10.

FIG. 2 illustrates a configuration of the distribution device 10.

The distribution device 10 is realized as a computer that includes one or more central processing units (CPUs) 101, one or more network interfaces (NW I/Fs) 102 to 104, an input/output device 105, and a memory 107. The respective units of the distribution device 10 are connected to each other via a communication path such as an internal bus 106. The NW I/F 102 is connected to the log output server 8 via the network 16. The NW I/F 103 is connected to the analysis server 11 via the network 17. The NW I/F 104 is connected to the management server 9 via the network 6. The memory 107 stores respective programs for a distributing function 111 and a logic load acquiring function 112, a distribution management table 121, an event type identification table 122, and a communication management table 123.

The respective programs of the distribution device 10 may be stored in advance in the memory 107 of the distribution device 10 and may be recorded on a recording medium usable by the distribution device 10 and be installed in the memory 107 as necessary. The recording medium is a storage medium that can be detachably attached to an external device interface (not illustrated) of the distribution device 10, for example.

The distributing function 111 determines the analysis server 11 serving as a distribution destination of the event received from the log output server 8 based on the distribution management table 121 and transmits the event to the distribution destination.

Figure 3:
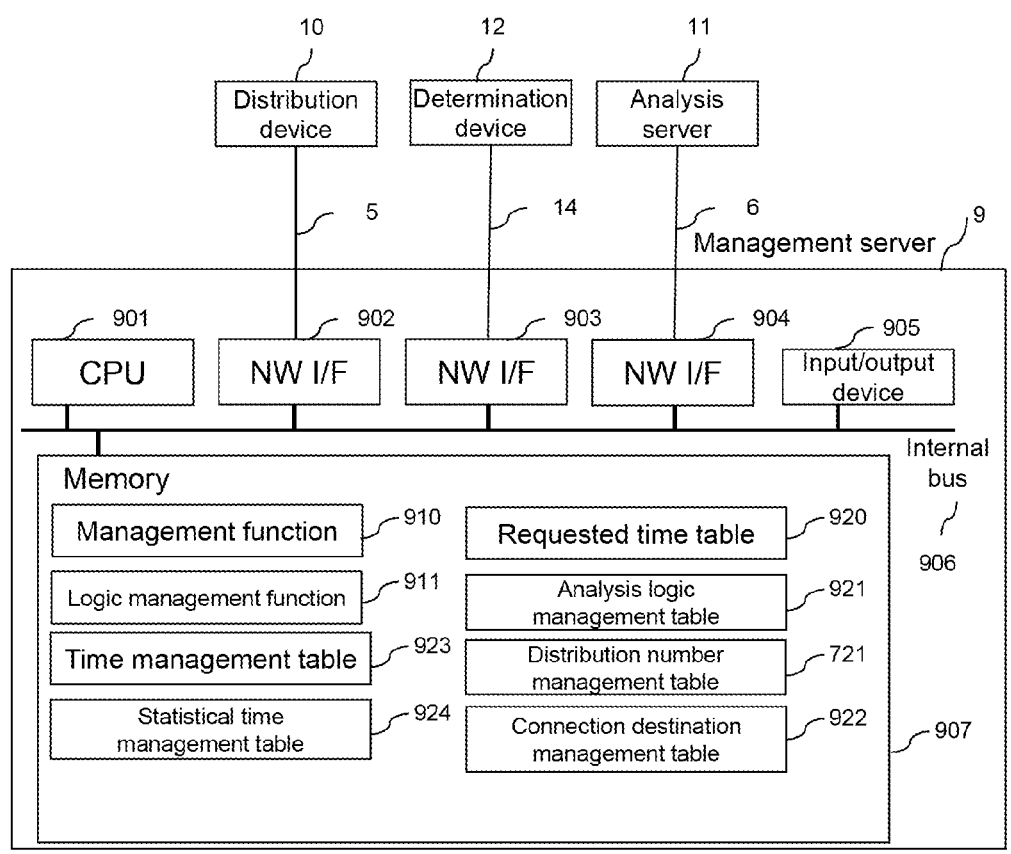
FIG. 3 illustrates a configuration of a management server 9.

FIG. 3 illustrates a configuration of the management server 9.

The management server 9 is realized as a computer that includes one or more CPUs 901, one or more network interfaces (NW I/Fs) 902 to 904, an input/output device 905, and a memory 907. The respective units of the management server 9 are connected to each other via a communication path such as an internal bus 906. The NW I/F 902 is connected to the distribution device 10 via the network 5. The NW I/F 903 is connected to the determination device 12 via the network 14. The NW I/F 904 is connected to the analysis server 11 via the network 6. The memory 907 stores respective programs for a management function 910 and a logic management function 911, a requested time table 920, an analysis logic management table 921, a distribution number management table 721, a connection destination management table 922, a time management table 923, and a statistical time management table 924.

Similarly to the distribution device 10, the respective programs of the management server 9 may be stored in advance in the memory 907 of the management server 9 and may be recorded on a recording medium usable by the management server 9 and be installed in the memory 907 as necessary.

The logic management function 911 acquires information on distribution from the distribution device 10 and the determination device 12 and analyzes a queue state of the analysis server 11 based on the information. The management function 910 determines a distribution destination corresponding to a requested time for an AP based on the analysis result obtained by the logic management function 911. Moreover, the management function 910 receives an instruction from an administrator of the computer system.

Figure 4:
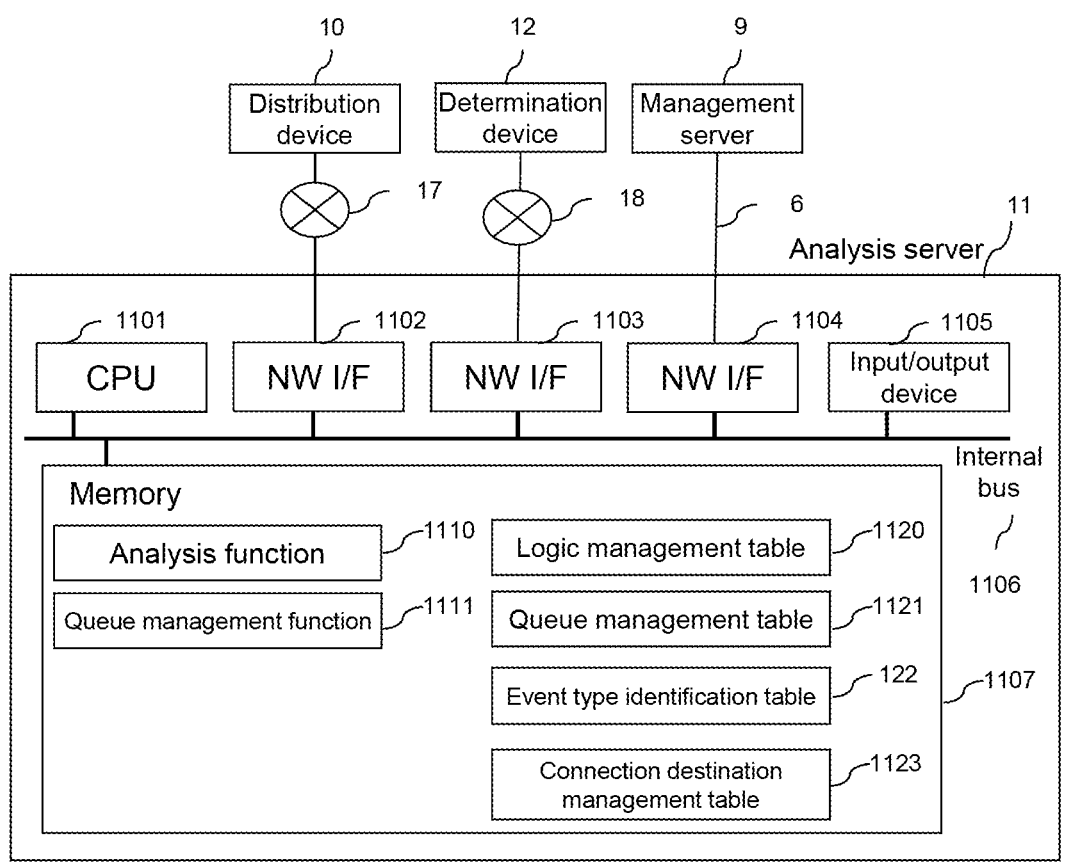
FIG. 4 illustrates a configuration of an analysis server 11.

FIG. 4 illustrates a configuration of the analysis server 11.

The analysis server 11 is realized as a computer that includes one or more CPUs 1101, one or more network interfaces (NW I/Fs) 1102 to 1104, an input/output device 1105, and a memory 1107. The respective units of the analysis server are connected to each other via a communication path such as an internal bus 1106. The NW I/F 1102 is connected to the distribution device 10 via the network 17. The NW I/F 1103 is connected to the determination device 12 via the network 18. The NW I/F 1104 is connected to the management server 9 via the network 6. The memory 1107 stores respective programs for an analysis function 1110 and a queue management function 1111, a logic management table 1120, a queue management table 1121, the event type identification table 122, and a connection destination management table 1123.

Similarly to the distribution device 10, the respective programs of the analysis server 11 may be stored in advance in the memory 1107 of the analysis server 11 and may be recorded on a recording medium usable by the analysis server 11 and be installed in the memory 1107 as necessary.

The analysis function 1110 selects an analysis logic for analyzing the event received from the distribution device 10 based on the event type identification table 122 and the logic management table 1120 and executes an analyzing process according to the analysis logic. The queue management function 1111 stores the event received from the distribution device 10 temporarily in the queue management table 1121 and fetches the event from the queue management table 1121 according to the need of the analysis function 1110. In the following description and the drawings, the queue management table 1121 in the analysis server 11 is sometimes referred to simply as a queue.

Figure 5:
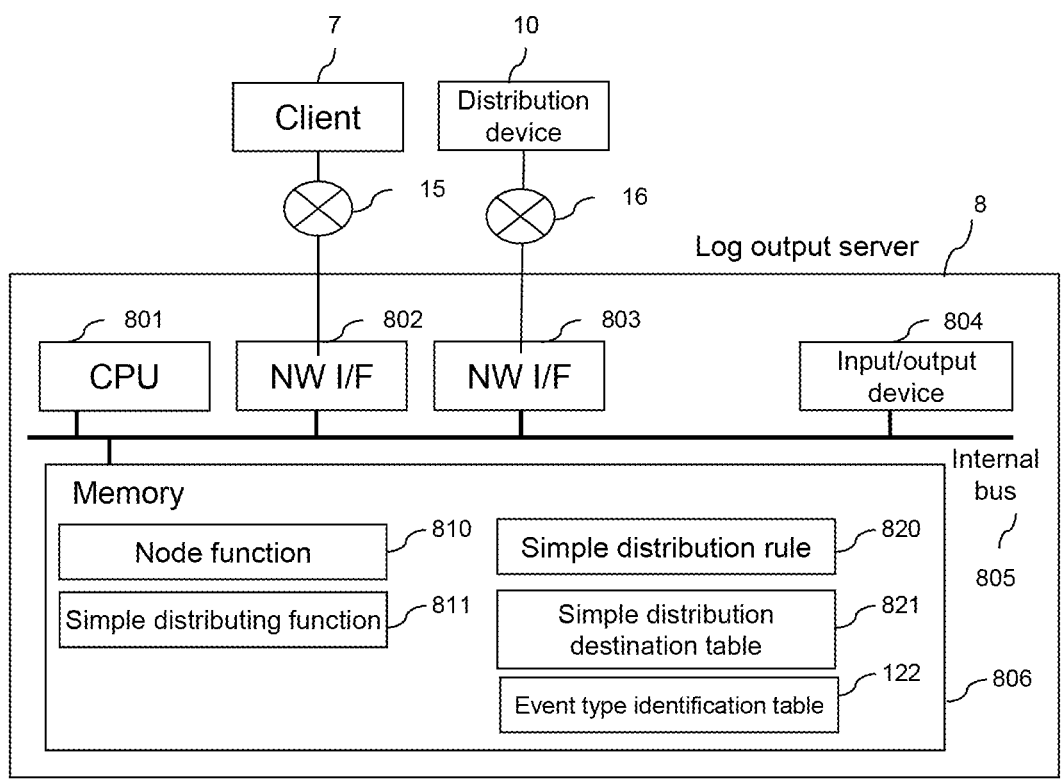
FIG. 5 illustrates a configuration of a log output server 8.

FIG. 5 illustrates a configuration of the log output server 8.

The log output server 8 is realized as a computer that includes one or more CPUs 801, one or more network interfaces (NW I/Fs) 802 and 803, an input/output device 804, and a memory 806. The respective units of the log output server 8 are connected to each other via a communication path such as an internal bus 805. The NW I/F 802 is connected to the client 7 via the network 15. The NW I/F 803 is connected to the distribution device 10 via the network 16. The memory 806 stores respective programs for a node function 810 and a simple distributing function 811, a simple distribution rule 820, a simple distribution destination table 821, and the event type identification table 122.

Similarly to the distribution device 10, the respective programs of the log output server 8 may be stored in advance in the memory 806 of the log output server 8 and may be recorded on a recording medium usable by the log output server 8 and be installed in the memory 806 as necessary.

The node function 810 executes processing for the request received from the client 7. The simple distributing function 811 selects the distribution device 10 according to the simple distribution rule 820 among the distribution devices 10 registered in the simple distribution destination table 821 and distributes processing to the selected distribution device 10 in order to transmit an access log output in the course in which the request of the client 7 is processed by the node function 810 to the distribution device 10.

Figure 6:
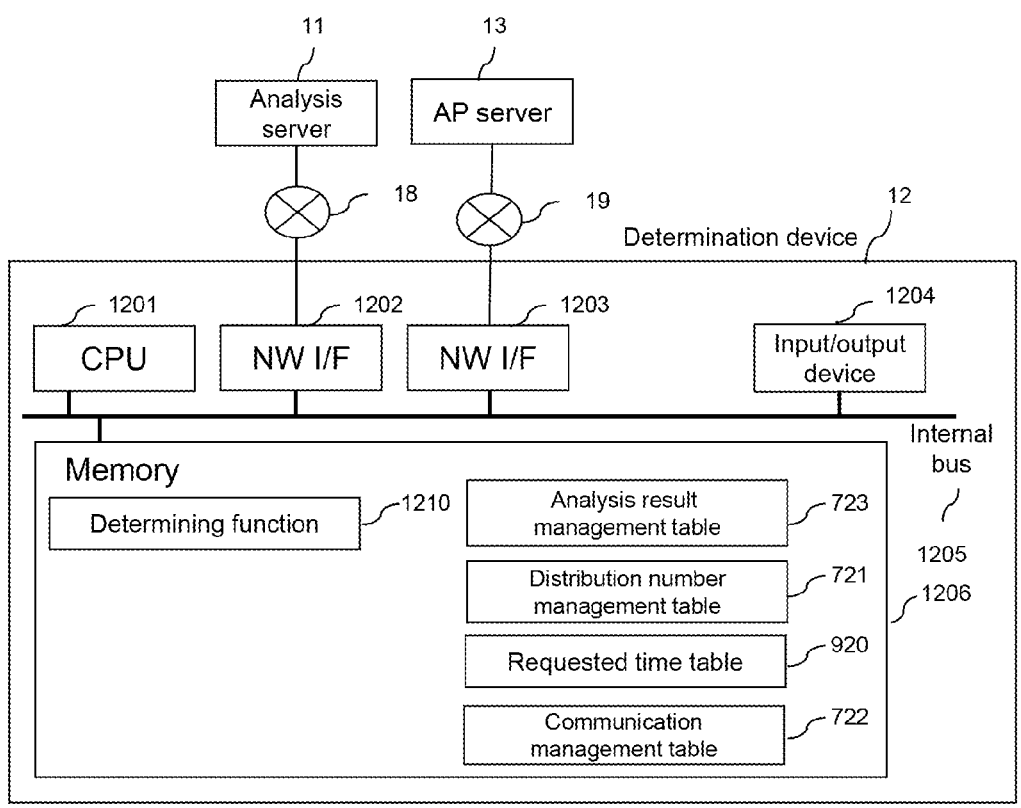
FIG. 6 illustrates a configuration of a determination device 12.

FIG. 6 illustrates a configuration of the determination device 12.

The determination device 12 is realized as a computer that includes one or more CPUs 1201, one or more network interfaces (NW I/Fs) 1202 and 1203, an input/output device 1204, and a memory 1206. The respective units of the determination device 12 are connected to each other via a communication path such as an internal bus 1205. The NW I/F 1202 is connected to the analysis server 11 via the network 18. The NW I/F 1203 is connected to the AP server 13 via the network 19. The memory 1206 stores a program for a determining function 1210, an analysis result management table 720, a distribution number management table 721, a requested time table 920, a communication management table 722.

Similarly to the distribution device 10, the respective programs may be stored in advance in the memory 1206 of the determination device 12 and may be recorded on a recording medium usable by the determination device 12 and be installed in the memory 1206 as necessary.

The determining function 1210 stores the analysis result information received from the plurality of analysis servers 11 in the analysis result management table 720, determines an analysis value having the highest probability as an estimated value based on the analysis values included in the plurality of items of analysis result information, and transmits the estimated value to the AP server 13.

FIG. 7 illustrates the distribution management table 121 stored in the distribution device 10.

The distribution management table 121 is information for distributing events that the distribution device 10 has received from the log output server 8 and illustrates an instruction for distribution corresponding to the class of an event. The distribution management table 121 has records for each event type. The event type indicates the class of a requested time. The requested time is the upper limit of a processing time (required time) usable for analysis and is requested by an AP. In the present embodiment, the event type includes a fixed time type and a realtime type. The requested time of the realtime type is shorter than the requested time of the fixed time type. Each record of the distribution management table 121 includes an event type field 1211, a distribution order field 1212, an updated time field 1213, and a distribution number field 1214.

An event type is registered in the event type field 1211. The content registered herein is the content of an event type field 1221 of the event type identification table 122 described later. The priority orders of a plurality of analysis servers 11 which is candidates for a distribution destination of an event corresponding to the event type are registered in the distribution order field 1212. An updated time of the corresponding record is registered in the updated time field 1213. A distribution number which is the number of analysis servers 11 serving as distribution destinations of an event corresponding to the event type is registered in the distribution number field 1214.

In the example of this drawing, when the event type is "fixed time type," the distribution device 10 distributes to "five" analysis servers 11 which correspond to the distribution number. The distribution device 10 selects a number of analysis servers 11 corresponding to the distribution number in descending order of the positions registered in the distribution order field 1212 as the distribution destinations. The distribution number may be smaller than the number of analysis servers 11 registered in the distribution order field 1212.

FIG. 8 illustrates the event type identification table 122 stored in the distribution device 10.

The event type identification table 122 is information for identifying the events received from the log output server 8. The event type identification table 122 has records for each event type. Each record includes an event type field 1221, a protocol field 1222, and a header field 1223.

An event type determined in the computer system is registered in the event type field 1221. A protocol name of the event received from the log output server 8 is registered in the protocol field 1222. The name of a specific header referenced to identify an event type is registered in the header field 1223. The distribution device 10 identifies the corresponding event type by referring to the protocol and the specific header of an event.

FIG. 9 illustrates the communication management table 123 stored in the distribution device 10.

An IP address and a netmask required for the distribution device 10 to communicate with a connection destination are registered in the communication management table 123. The connection destination is the analysis server 11, the management server 9, or the like. The communication management table 123 has records for each connection destination. Each record includes a class field 1231, an address field 1232, and a mask value field 1233.

The connection destination name for identifying a connection destination is registered in the class field 1231. An IP address and a netmask value of the connection destination are registered in the address field 1232 and the mask value field 1233, respectively.

Figure 10:
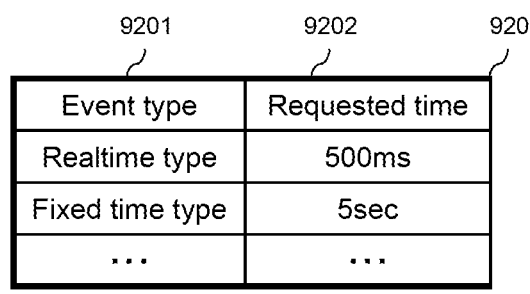
FIG. 10 illustrates a requested time table 920 stored in the management server 9.

FIG. 10 illustrates the requested time table 920 stored in the management server 9.

A requested time which is the analysis time requested by an AP is registered in the requested time table 920. The requested time table 920 has records for each event type. Each record includes an event type field 9201 and a requested time field 9202.

An event type is registered in the event type field 9201. A requested time for the event type is registered in the requested time field 9202.

In the example of the drawing, when the event type is "realtime type," the request of the AP server 13 indicates that respective estimated values are to be transmitted to the AP server 13 within a requested time of "500 ms" or shorter from the occurrence of events. Three or more event types corresponding to three or more requested time may be registered in the requested time table 920.

FIG. 11 illustrates the analysis logic management table 921 stored in the management server 9.

The analysis logic management table 921 is information on analysis logics executed by the respective analysis servers 11. The management server 9 calculates the time required for the analysis server 11 to analyze one event based on this information. The analysis logic management table 921 has records for each combination of an event type, an analysis server, and an analysis logic. Each record includes an event type field 9211, an analysis server field 9212 with an analysis server 11, and an analysis logic field 9213.

An event type is registered in the event type field 9211. A name for identifying the analysis server 11 is registered in the analysis server field 9212. An analysis logic for an event type corresponding to the analysis server 11 is registered in the analysis logic field 9213. An analysis time which is the time required for an analyzing process when the analysis server 11 executes the analysis logic is registered in the analysis time field 9214.

In the example of the drawing, the analysis time required for the analysis server 11 corresponding to "analysis server a" to process a realtime type event according to the analysis logic "R1" is "123 ms". In the present embodiment, the management server 9 calculates a difference between the time at which information indicating the distribution of an event by the distribution device 1 is received from the distribution device 10 and the time at which information indicating reception of the analysis result of the event obtained by the determination device 12 is received from the determination device 12 as an analysis time in a state in which the queue of the analysis server 11 is vacant. Besides this, the distribution device 10, the management server 9, or the like may transmit a pseudo-event to the analysis server 11 and acquire an analysis result, and the time required for this may be calculated as an analysis time.

In the system of FIG. 1, when the system configuration is changed due to scale-out or the like, the respective performance of the plurality of analysis servers 11 may become different as described above.

In such a situation, when the same event is processed by the respective analysis servers 11, for example, the time required for the event analyzing process may be different.

That is, the time required for the event analyzing process includes the performance information of the analysis server 11.

Thus, when distribution described later is performed, by using the time required for the event analyzing process as the performance information, events can be distributed more appropriately with the performance of the analysis server taken into consideration.

FIG. 12 illustrates the connection destination management table 922 stored in the management server 9.

The connection destination management table 922 is information on an IP address and a netmask required for the management server 9 to communicate with a connection destination. The connection destination is the distribution device 10, the determination device 12, the analysis server 11, or the like. The connection destination management table 922 has records for each connection destination. Each record includes a class field 9221, an address field 9222, and a mask value field 9223.

The name of a connection destination is registered in the class field 9221. An IP address and a netmask value of the connection destination are registered in the address field 9222 and the mask value field 9223, respectively.

FIG. 13 illustrates the time management table 923 stored in the management server 9.

The time management table 923 is information for understanding the number of and the type of events registered in the queue of the analysis server 11. Moreover, the time management table 923 illustrates a quotation time used for determining a realtime type distribution destination. The management server 9 receives information the analysis server 11 to which an event is distributed and information indicating the analysis server 11 from which the analysis result information is obtained from the distribution device 10 and the determination device 12 which are disposed before and after the analysis server 11 and registers the information in the time management table 923 sequentially. The management server 9 can predict the state of the queues of the respective analysis servers 11 by referring to the time management table 923. The time management table 923 has records for each information that the management server 9 has received from the distribution device 10 or the determination device 12. Each record includes an analysis server field 9231, a reception source field 9232, an event type field 9233, an event class field 9234, a quotation time field 9235, and an updated time field 9235. The estimated time corresponds to a quotation time or the like.

Identification information of the analysis server 11 included in the information received from the distribution device 10 or identification information of the analysis server 11 included in the information received from the determination device 12 is registered in the analysis server field 9231. Information indicating one of the distribution device 10 and the determination device 12 from which the information in the record has been received is registered in the reception source field 9232. An event type of an event included in the information received from the distribution device 10 or an event type of an event included in the information received from the distribution device 10 is registered in the event type field 9233. An event class of the event is registered in the event class field 9234. The event class is the identification information of the client 7, the identification information of the user of the client 7, or the like. A quotation time required until analysis of an event is completed after the event is input to a queue when processing is executed according to an analysis logic corresponding to an event type of the record in the analysis logic management table 921 is registered in the quotation time field 9235. The quotation time received from the determination device 12 is not registered in the quotation time field 9235. The time at which the record is updated is registered in the updated time field 9235. The management server 9 updates the time management table 923 according to an analysis result registering process described later.

For example, in a mobile communication system, the event class is identification information of a communication terminal device. When the analysis server 11 analyzes a communication traffic or the like according to the event class, it is possible to determine the charging and bandwidth control on a specific communication terminal device.

In the drawing, the second record indicates that the quotation time required until the determination device 12 receives analysis result information from "analysis server b" after the distribution device 10 transmits an event having the "realtime type" and the identifier "B" to "analysis server b" is "0.123 sec". Moreover, the fourth record 0 indicates that the determination device 12 has received the analysis result information on the event appearing on the second record from "analysis server b". According to the second record, it can be understood that one event from the distribution device 10 is stored in the queue of "analysis server b". According to the fourth record, it can be understood that one event in a queue has been dequeued and analyzed and the determination device 12 has received the analysis result information. In this manner, the management server 9 can estimate the states of the respective analysis servers 11 by scanning the time management table 923.

FIG. 14 illustrates the statistical time management table 924 stored in the management server 9.

The statistical time management table 924 illustrates an average quotation time used for determining a distribution destination of a fixed time type. The statistical time management table 924 has records for each combination of the analysis server 11 and the analysis logic. Each record includes an analysis server field 9241, an average quotation time field 9242, an updated time field 9243, a total time field 9244, a counter field 9245, and an analysis logic field 9246.

Identification information of the analysis server 11 is registered in the analysis server field 9241. An average quotation time required until analysis result information is output after a new event of the analysis logic is input to the current analysis server 11 is calculated based on the information in the total time field 9244 and the counter field 9245 and is registered in the average quotation time field 9242. The average quotation time may not include an analysis time of the new event. The time at which the record is updated is registered in the updated time field 9243. A total time which is an accumulated time required until analysis of an event is completed after the event is input to the analysis logic of the analysis server 11 is registered in the total time field 9244. A counter value of an event input to the analysis logic of the analysis server 11 is registered in the counter field 9245. The total time and the counter value may be a value accumulated from the start of the operation of the analysis server 11 and may be reset periodically. Identification information of an analysis logic is registered in the analysis logic field 9246. The identification information of an event type corresponding to the analysis logic may be registered instead of the identification information of the analysis logic.

The management server 9 updates the statistical time management table 924 according to an analysis result registering process described later. The average quotation time registered in the average quotation time field 9242 is the quotient obtained by dividing the total time in the total time field 9244 by the counter value in the counter field 9245. That is, the average quotation time is an average value of the time required until analysis result information is output after an event of the analysis logic of the analysis server 11 is input. In this way, a statistical average quotation time when events are processed by the respective analysis servers 11 is registered in the statistical time management table 924. By using the statistical time management table 924, the management server 9 can perform distribution so as to satisfy the requested time without the need to understand the queue state of the analysis server 11 for the respective events. The statistical time management table 924 may have records for each analysis server 11.

FIG. 15 illustrates the logic management table 1120 stored in the analysis server 11.

The logic management table 1120 illustrates analysis logics of each event that the analysis server 11 has received from the distribution device 10. The logic management table 1120 has records for each event type. Each record includes an event type field 11201 and an analysis logic field 11203.

An event type is registered in the event type field 11201. An analysis logic for analyzing an event corresponding to the event type is registered in the analysis logic field 11203.

FIG. 16 illustrates the queue management table 1121 stored in the analysis server 11.

The analysis server 11 registers the events received from the distribution device 10 sequentially in the queue management table 1121. Moreover, the analysis server 11 executes the events sequentially in descending order of the positions in the queue management table 1121. The queue management table 1121 has records for each event. Each record includes a number (No.) field 11211, an analysis logic field 11212, an event content field 11213, and a received time field 11214.

A serial number of the event is registered in the number field 11211. An analysis logic of the event is registered in the analysis logic field 11212. An event content received from the distribution device 10 is registered in the event content field 11213. Here, the event content is all of the data of the received events. For example, the event content is received binary data. The time at which the record is registered is registered in the received time field 11214.

FIG. 17 illustrates the connection destination management table 1123 stored in the analysis server 11.

The connection destination management table 1123 is information on an IP address and a netmask required for the analysis server 11 to communicate with a connection destination. The connection destination is the distribution device 10, the determination device 12, the management server 9, or the like. The connection destination management table 1123 has records for each connection destination. Each record includes a class field 11231, an address field 11232, and a mask value field 11233.

The name of a connection destination is registered in the class field 11231. An IP address and a netmask value of the connection destination are registered in the address field 11232 and the mask value field 11233, respectively.

Figure 18:
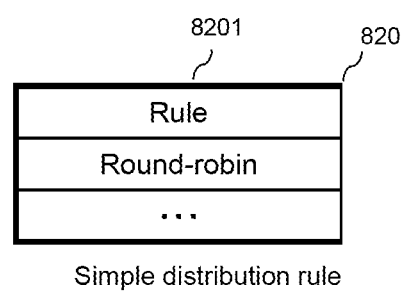
FIG. 18 illustrates a simple distribution rule 820 stored in the log output server 8.

FIG. 18 illustrates the simple distribution rule 820 stored in the log output server 8.

The log output server 8 selects a destination of an event among the plurality of distribution devices 10 according to the simple distribution rule 820. The simple distribution rule 820 includes a rule field 8201. A distribution logic for selecting a destination of an event is registered in the rule field 8201.

FIG. 19 illustrates the simple distribution destination table 821 stored in the log output server 8.

Information on an IP address and a netmask required for the log output server 8 to transmit an event to the distribution device 10 is registered in the simple distribution destination table 821. The simple distribution destination table 821 has records for each distribution device 10. Each record includes a class field 8211, an address field 8212, and a mask value field 8213.

The name of the destination distribution device 10 is registered in the class field 8211. An IP address and a netmask value corresponding to the name of a registration destination of the record are registered in the address field 8212 and the mask value field 8213, respectively.

FIG. 20 illustrates the analysis result management table 720 stored in the determination device 12.

The determination device 12 registers the analysis result information received from the analysis server 11 in the analysis result management table 720, makes determination based on the analysis result management table 720 according to the majority decision or the like to determine an estimated value, and transmits the estimated value to the AP server 13. The analysis result management table 720 has records for each item of analysis result information. Each record includes a number (No.) field 12201, an event type field 12202, an analysis server field 12203, an event class field 12204, an analysis value field 12205, and a received time field 12206.

A serial number of the analysis result information is registered in the number field 12201. An event type of a target event of the analysis result information is registered in the event type field 12202. Identification information of the analysis server 11 (corresponding to the transmitter of the analysis result information) that has output the analysis result information is registered in the analysis server field 12203. An event class of the event is registered in the event class field 12204. An analysis value which is an analysis result included in the analysis result information and is output by the analysis of the analysis server 11 is registered in the analysis value field 12205. The time at which the analysis result information is received is registered in the received time field 12206. The determination device 12 identifies respective events using the two items of information in the analysis server field 12203 and the event class field 12204 and makes determination using the identified events.

FIG. 21 illustrates the distribution number management table 721 stored in the management server 9 and the determination device 12.

The distribution number management table 721 illustrates a distribution number of each event type. The determination device 12 determines the point in time at which determination on the analysis result information is performed according to the majority decision based on the distribution number management table 721 and the number of items of analysis result information. The distribution number management table 721 has records for each event type. Each record includes an event type field 12211 and a distribution number field 12212.

An event type is registered in the event type field 12211. A distribution number which is the number of analysis servers 11 serving as distribution destinations of an event corresponding to the event type is registered in the distribution number field 12212.

FIG. 22 illustrates the communication management table 722 stored in the determination device 12.

The communication management table 722 is information on an IP address and a netmask required for the determination device 12 to communicate with a connection destination. The connection destination is the management server 9, the AP server 13, or the like. The communication management table 722 has records for each connection destination. Each record includes a class field 12231, an address field 12232, and a mask value field 12233.

The name of a connection destination is registered in the class field 12231. An IP address and a netmask value of the connection destination are registered in the address field 12232 and the mask value field 12233, respectively.

Hereinafter, the operation of the computer system according to the present embodiment will be described.

Figure 23:
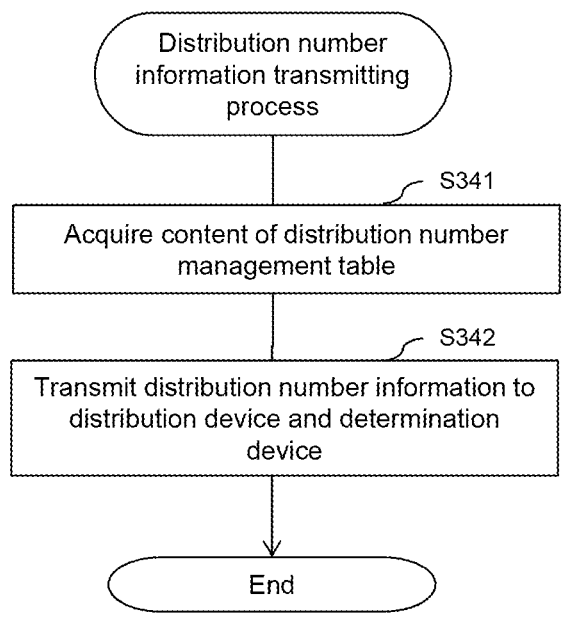
FIG. 23 illustrates a distribution number information transmitting process of the management server 9.

FIG. 23 illustrates a distribution number information transmitting process of the management server 9.

The management function 910 of the management server 9 registers the content of the distribution number management table 721 according to an input from an administrator. The management function 910 performs a distribution number information transmitting process of transmitting the content of the distribution number management table 721 to the distribution device 10 and the determination device 12.

The management function 910 acquires the content of the distribution number management table 721 (step S341). Subsequently, the management function 910 transmits the information acquired in step S341 to the distribution device 10 and the determination device 12 as distribution number information (step S342). The distribution number information indicates a distribution number of each event type. The distribution number information transmitting process is performed in this manner.

Figure 24:
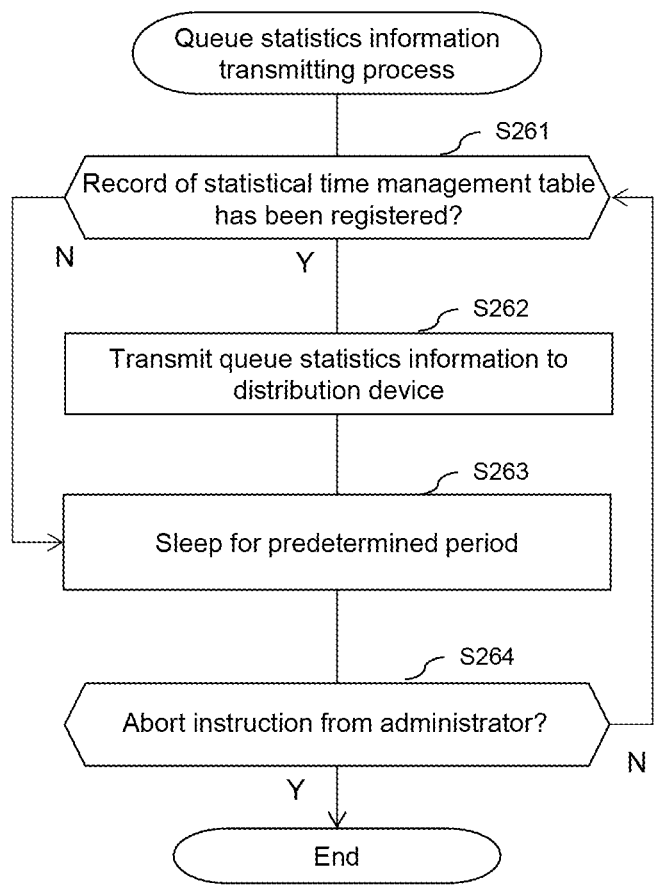
FIG. 24 illustrates a queue statistics information transmitting process of the management server 9.

FIG. 24 illustrates a queue statistics information transmitting process of the management server 9.

The management function 910 of the management server 9 performs a queue statistics information transmitting process of transmitting queue statistics information indicating the state of the queue of the analysis server 11 based on the statistical time management table 924 periodically to the distribution device 10.

The management function 910 checks whether the record of the statistical time management table 924 has been registered (step S261). The management function 910 proceeds to step S262 when it is determined in step S261 that the record has been registered and proceeds to step S263 when it is determined that the record has not been registered. When it is determined in step S261 that the record has been registered, the management function 910 transmits queue statistics information to the distribution device 10 as information for allowing the distribution device 10 to determine a distribution destination of an event of a fixed time type (step S262). The queue statistics information includes the information in the analysis server field 9241 and the average quotation time field 9242 of the statistical time management table 924. Subsequently, the management function 910 performs sleep (standby) for a predetermined period (step S263). Then, the management function 910 checks whether an abort instruction has been input from an administrator. When the abort instruction has been input, the management function 910 ends the queue statistics information transmitting process. When the abort instruction has not been input, the flow returns to step S261 (step S264). The management function 910 may determine whether the respective analysis servers 11 satisfy the requested time based on the average quotation time and may exclude the analysis server 11 which is determined not to satisfy the requested time from the queue statistics information. The queue statistics information transmitting process is performed in this manner.

Figure 25:
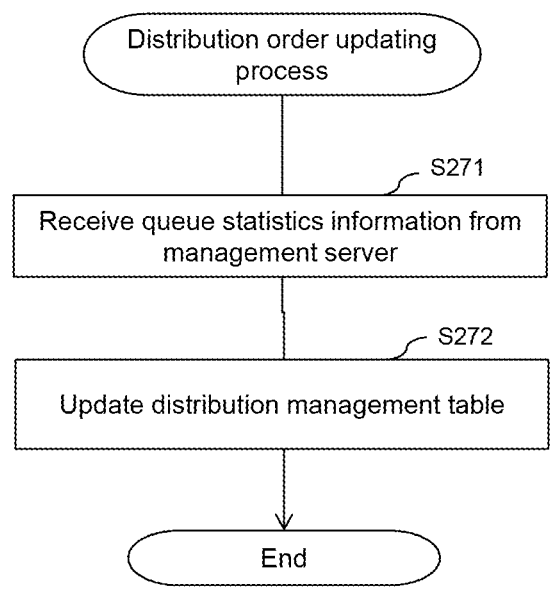
FIG. 25 illustrates a distribution order updating process of the distribution device 10.

FIG. 25 illustrates a distribution order updating process of the distribution device 10.

The distributing function 111 of the distribution device 10 having received the queue statistics information from the management server 9 according to the queue statistics information transmitting process performs a distribution order updating process of updating the distribution management table 121 based on the queue statistics information.

The distributing function 111 receives queue statistics information from the management server 9 (step S271). Subsequently, the distributing function 111 updates the distribution management table 121 based on the queue statistics information (step S272). Here, the distributing function 111 determines the priority orders of the analysis servers 11 serving as the distribution destinations of the event of the fixed time type based on the average quotation time of the respective analysis servers 11 included in the queue statistics information and registers the priority orders in the distribution order field 1212 corresponding to the fixed time type in the distribution management table 121. Further, the distributing function 111 registers the time at which the record is updated in the updated time field 1213. The distribution order updating process is performed in this manner. Moreover, the distributing function 111 of the distribution device 10 having received the distribution number information from the management server 9 according to the distribution number information transmitting process registers the distribution number included in the distribution number information in the distribution number management table 721.

Figure 26:
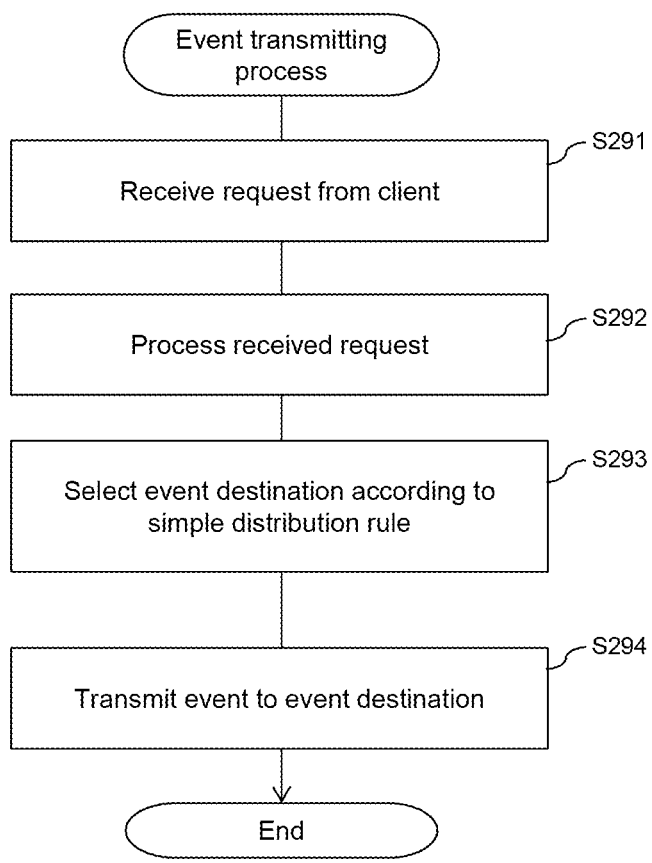
FIG. 26 illustrates an event transmitting process of the log output server 8.

FIG. 26 illustrates an event transmitting process of the log output server 8.

The node function 810 of the log output server 8 having received a request from the client 7 performs a process corresponding to the request and performs an event transmitting process of transmitting an access log indicating the process to the distribution device 10 as an event.

The node function 810 receives a request from the client 7 (step S291). Subsequently, the node function 810 processes the request received in step S291 and generates an access log thereof (step S292). The simple distributing function 811 selects the distribution device 10 corresponding to an event destination according to the simple distribution rule 820 among the distribution devices 10 registered in the distribution destination table 821 (step S293). Moreover, the node function 810 generates an event from the generated access log and transmits the event to the event destination (step S294). The event generated in this step follows the content of the event type identification table 122 and has a protocol and a header corresponding to an event type. The event transmitting process is performed in this manner.

Figure 27:
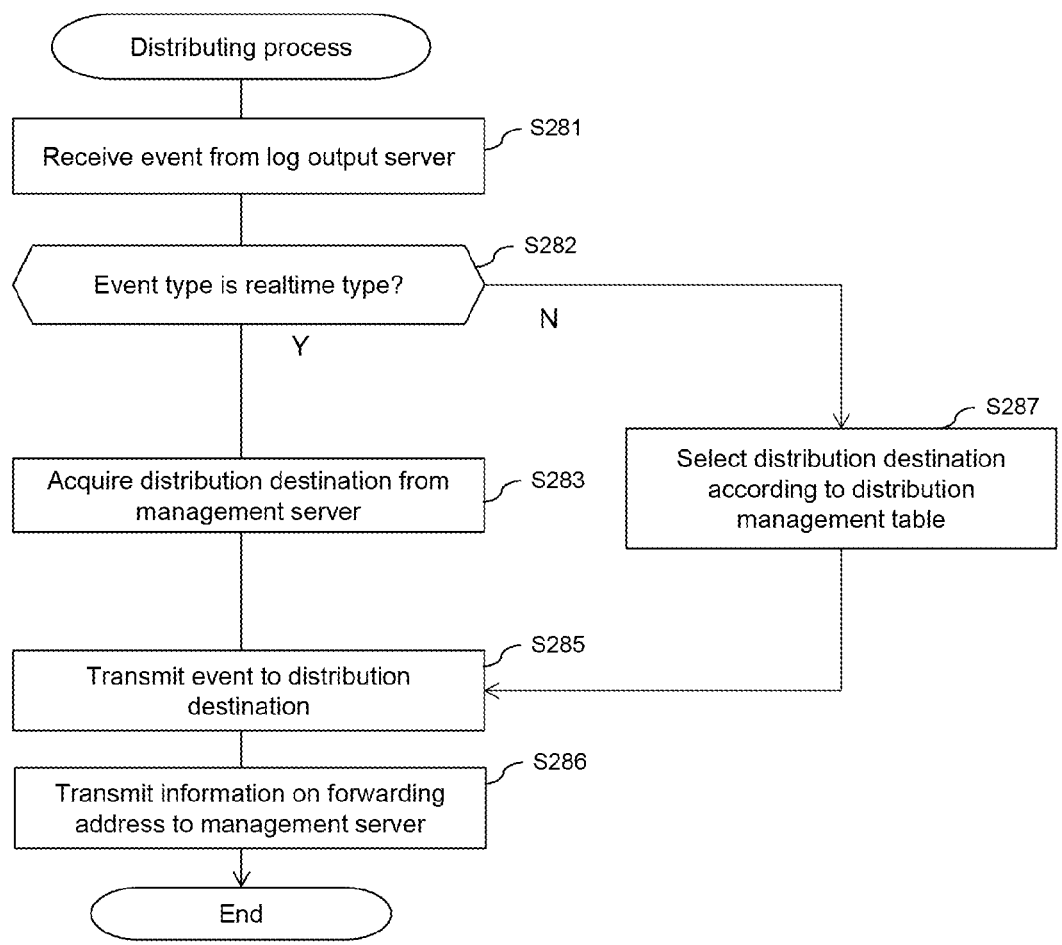
FIG. 27 illustrates a distributing process of the distribution device 10.

FIG. 27 illustrates a distributing process of the distribution device 10.

The distributing function 111 of the distribution device 10 having received the event from the log output server 8 performs a distributing process of determining the distribution destination analysis server 11 and transmitting the event.

The distributing function 111 receives an event from the log output server 8 (step S281). Subsequently, the distributing function 111 identifies an event type of the received event based on the event type identification table 122, proceeds to step S283 when the event type is a realtime type, and proceeds to step S287 when the event type is not the realtime type (step S282). Here, the distributing function 111 determines the protocol and the header of the received event based on the information in the protocol field 1222 and the header field 1223 of the event type identification table 122 and acquires an event type in the event type field 1221 corresponding to the protocol and header. Based on this information, the determination of step S282 is performed.

When it is determined in step S282 that the event type is not the realtime type (but a fixed time type) (step S282: N), the distributing function 111 acquires a distribution destination that matches the event type field 1211 by referring to the distribution management table 121 (step S287) and proceeds to step S285. Here, the distributing function 111 selects a number of analysis servers 11 corresponding to the distribution number in the distribution number field 1214 in descending order of the positions in the distribution order field 1212 as a distribution destination among the plurality of analysis servers 11 corresponding to the distribution orders in the distribution order field 1212.

When it is determined in step S282 that the event type is the realtime type (step S282: Y), the distributing function 111 acquires the distribution destination from the management server 9 (step S283). Here, the distributing function 111 transmits a distribution destination inquiry to the management server 9, receives a distribution destination response to the distribution destination inquiry from the management server 9, and acquires a distribution destination included in the distribution destination response.

The distributing function 111 transmits the event received in step S281 to the analysis server 11 corresponding to the distribution destination acquired in step S284 or S287 (step S285). Moreover, the distributing function 111 transmits distribution destination information indicating the distribution destination to the management server 9 (step S286). The distribution destination information includes an event type and an event class of the event transmitted by the distribution device 10, the identification information of the distribution destination analysis server 11, and the like. The distributing process is performed in this manner.

The respective analysis servers 11 which are distribution destinations to which an event has been transmitted analyze the events according to the same analysis logic.

The distributing function 111 may select a predetermined number of analysis servers 11 in which the number of events registered in the queue is small when distributing an event of the realtime type.

In steps later than step S282, when the received event is a realtime type event, the distribution device 10 may acquire a distribution destination from the distribution management table 121 as in step S287. When the received event is not the realtime type event, the distribution device 10 may acquire the distribution destination from the management server 9 by transmitting a distribution destination inquiry as in steps S283 and S284.

According to this process, the distribution device 10 can select a distribution destination ideal for analyzing the fixed time type event. Moreover, the distribution device 10 can acquire a distribution destination ideal for analyzing the realtime type event from the management server 9.

Figure 28:
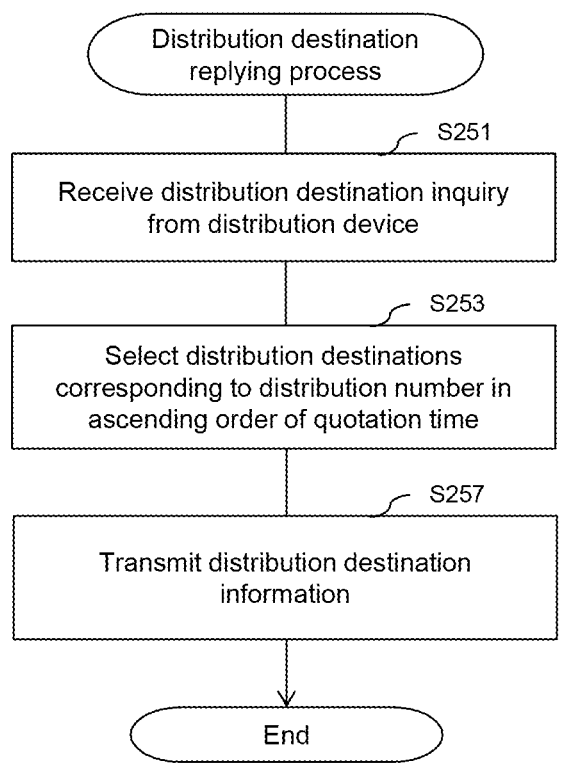
FIG. 28 illustrates a distribution destination replying process of the management server 9.

FIG. 28 illustrates a distribution destination replying process of the management server 9.

The management function 910 of the management server 9 having received the distribution destination inquiry from the distribution device 10 according to the distributing process performs a distribution destination replying process of transmitting a distribution destination response indicating the distribution destination to the distribution device 10.

The management function 910 receives a distribution destination inquiry from the distribution device 10 (step S251). Subsequently, the management function 910 selects a number of analysis servers 11 corresponding to the distribution number of the target event type in ascending order of the quotation time in the time management table 923 (step S253). Here, the management function 910 acquires the distribution number of the target event type by referring to the distribution number management table 721. In the present embodiment, the target event type is a realtime type. Further, the management function 910 selects a number of analysis servers 11 corresponding to the distribution number in ascending order of the quotation time as the distribution destinations by referring to the quotation time (waiting time) indicating the states of the queues of the respective analysis servers 11 in the time management table 923. Subsequently, the management function 910 transmits a distribution destination response indicating the distribution destinations to the distribution device 10 that has transmitted the distribution destination inquiry as a response to the distribution destination inquiry (step S257). The management function 910 may determine whether the respective analysis servers 11 satisfy the requested time based on the quotation time and may exclude the analysis server 11 that is determined not to satisfy the requested time from the distribution destination response. The distribution destination replying process is performed in this manner.

Here, although the management function 910 may repeat the process of step S252 whenever the distribution destination inquiry is received, the progress of the distribution destination replying process may be shared between a plurality of distribution destination inquiries by taking processing efficiency into consideration.

According to this process, the management server 9 can select a distribution destination ideal for analyzing the realtime type event and transmit the selected distribution destination to the distribution device 10.

Figure 29:
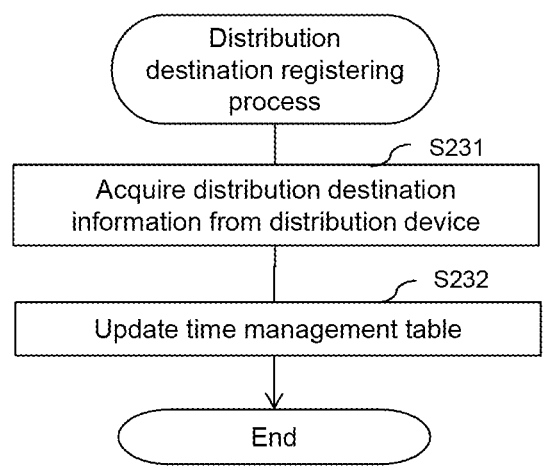
FIG. 29 illustrates a distribution destination registering process of the management server 9.

FIG. 29 illustrates a distribution destination registering process of the management server 9.

The management function 910 of the management server 9 having received the distribution destination information from the distribution device 10 according to the distributing process performs a distribution destination registering process of registering the distribution destination information received from the distribution device 10 in the time management table 923. The distribution destination information indicates a distribution destination of the distribution device 10 and includes the identification information of a number of analysis servers 11 corresponding to the distribution number in descending order of the positions of the analysis servers 11 included in the distribution order field 1212 of the distribution management table 121.

The management function 910 receives the distribution destination information from the distribution device 10 (step S231). Subsequently, the management function 910 registers the information such as the identification information of the analysis server 11 to which the distribution device 10 has distributed the event or the event class, acquired in step S231 in the time management table 923 (step S232). The distribution destination registering process is performed in this manner.

Figure 30:
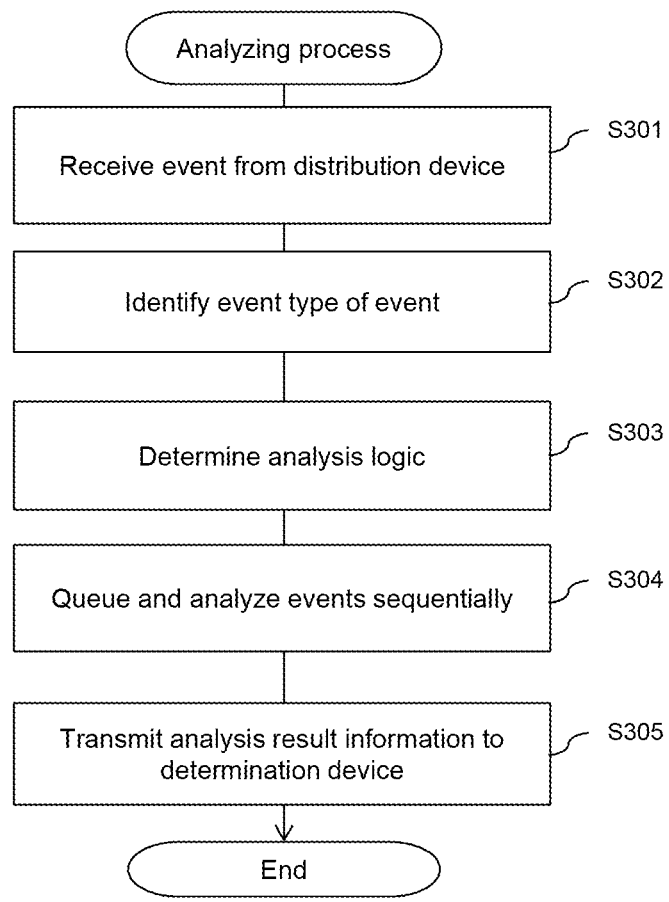
FIG. 30 illustrates an analyzing process of the analysis server 11.

FIG. 30 illustrates an analyzing process of the analysis server 11.

The analysis function 1110 of the analysis server 11 having received the event from the distribution device 10 according to the distributing process performs an analyzing process of analyzing the event.

The analysis function 1110 of the analysis server 11 receives an event from the distribution device 10 (step S301). Subsequently, the analysis function 1110 identifies the event type of the received event by referring to the event type identification table 122 (step S302). An identifying method used herein is the same as the method used in step S282 of the distribution destination updating process.

The analysis function 1110 determines an analysis logic corresponding to the identified event type by referring to the logic management table 1120 (step S303). Subsequently, the analysis function 1110 registers the event received in step S301 in the queue management table 1121 using the queue management function 1111. After that, the analysis function 1110 analyzes the events in descending order of the positions in the queue management table 1121 to generate analysis result information indicating the analysis result (step S304). The analysis result information includes an event type and an event class of the analysis target events and an analysis value which is the analysis result. The analysis function 1110 transmits the analysis result information to the determination device 12 (step S305). Here, when a plurality of determination devices 12 is present, the analysis function 1110 selects the determination device 12 serving as the destination of the analysis result information among the plurality of determination devices 12 by distributing of accommodation according to the hash value of the event content in the event content field 11213 of the queue management table 1121, for example.

Figure 31:
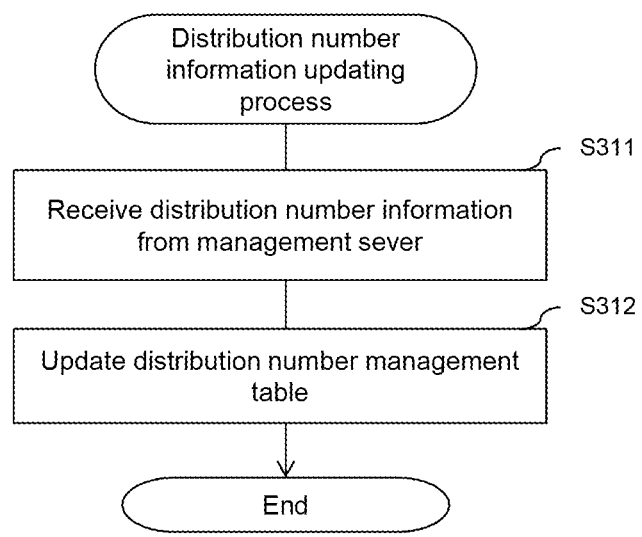
FIG. 31 illustrates a distribution number information updating process of the determination device 12.

FIG. 31 illustrates a distribution number information updating process of the determination device 12.

The determining function 1210 of the determination device 12 having received the distribution number information from the management server 9 according to the distribution number information transmitting process performs a distribution number information updating process.

The determining function 1210 receives distribution number information from the management server 9 (step S311). Subsequently, the determining function 1210 registers the distribution numbers of the respective event types in the distribution number management table 721 based on the received distribution number information (step S312). The distribution number information updating process is performed in this manner.

Figure 32:
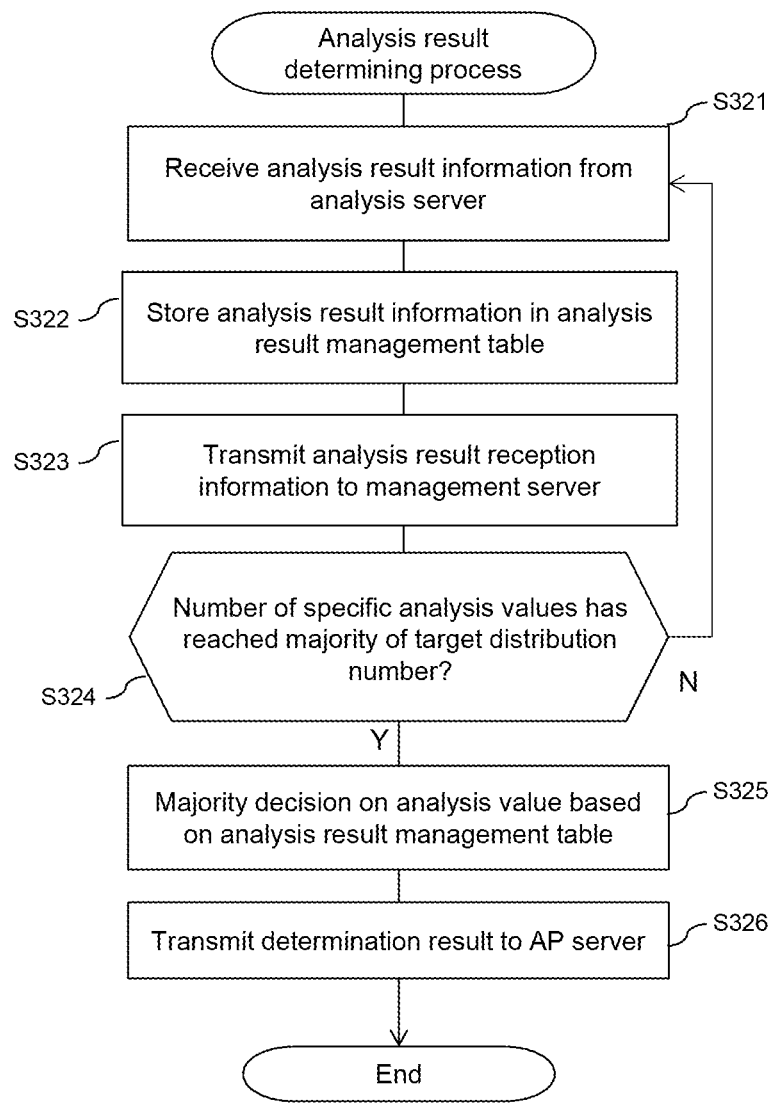
FIG. 32 illustrates an analysis result determining process of the determination device 12.

FIG. 32 illustrates an analysis result determining process of the determination device 12.

The determining function 1210 of the determination device 12 having received the analysis result information from the analysis server 11 according to the analyzing process performs an analysis result determining process of making majority decision.

The determining function 1210 receives analysis result information from the analysis server 11 (step S321). Subsequently, the determining function 1210 registers the received analysis result information in the analysis result management table 720 (step S322). Subsequently, the determining function 1210 transmits analysis result reception information indicating the reception of analysis result information to the management server 9 (step S323). The analysis result reception information includes an event type, an event class, and an analysis value included in the analysis result information. Subsequently, the determining function 1210 acquires the distribution number corresponding to the event type in the analysis result information from the distribution number management table 721 and counts the number of same analysis values among the analysis values included in the analysis result information having the same event type and the same event class from the analysis result management table 720. Subsequently, the determining function 1210 determines whether the number of specific analysis value has reached the majority of the target distribution number (the number of specific analysis values exceeds the half of the target distribution number) (step S324). Here, the determining function 1210 proceeds to step S325 when the counted number of items of analysis result information has reached the majority of the distribution number and proceeds to step S321 when the counted number has not reached the majority of the distribution number.

When it is determined in step S324 that the number of items of analysis result information has reached the majority of the distribution number, the determining function 1210 counts the number of items of analysis result information of the respective analysis values among the items of analysis result information extracted in step S324. After that, the determining function 1210 makes majority decision by comparing the numbers of items of analysis result information of the respective analysis values (step S325).

The determining function 1210 selects an analysis value which is determined to be the most numerous among the analysis values of the extracted analysis result information as an estimated value according to the majority decision and transmits the selected estimated value to the AP server 13 (step S326). The analysis result determining process is performed in this manner.

According to this process, it is possible to select an analysis value having the highest probability as the estimated value and to increase the reliability of the estimated value. Moreover, the determining function 1210 can determine the estimated value without waiting for all of the analysis result information and thus can shorten the time required for determining the estimated value.

If the analysis value is expressed in black or white (two values) like YES/NO, the determining function 1210 counts the total numbers of the respective analysis values and determines that an analysis value having the larger total number is a true value. On the other hand, if the analysis value is expressed in a numerical value (multiple values), for example, the determining function 1210 may use an average of all analysis values as the estimated value and may calculate a probability distribution of the analysis values and calculate an expectation from the probability distribution as the estimated value.

When the majority decision is made on two-valued analysis values, the distribution number is preferably an odd number. In the present embodiment, the distribution number (the number of analysis servers 11) is an odd number. However, if the total number of items of target analysis result information is large, when majority decision is made, the probability that the numbers of two-valued analysis values are approximately the same is low. In such a case, practically no problem may occur even if the distribution number is an even number. However, since there is still a possibility that the numbers of two-valued analysis values are the same, the determining function 1210 also has a countermeasure against this possibility.

When the numbers of a plurality of analysis values are the same, the determining function 1210 may select a predetermined designated value as the estimated value. In this case, the management server 9 may transmit a designated value input by an administrator to the determination device 12. Moreover, the determining function 1210 may apply a predetermined weighting factor to total numbers of a plurality of values and select one of the plurality of values as the estimated value based on the weighted total numbers. In this case, the management server 9 may transmit a weighing factor input from an administrator to the determination device 12.

Moreover, when the distribution number (the number of analysis servers 11) is particularly large, the determining function 1210 may select an analysis value of which the number has reached a predetermined determination number as the estimated value and transmit the selected analysis value to the AP server 13 without waiting until the number of certain analysis values reaches a number corresponding to the majority of the distribution number in order to make the majority decision. By doing so, it is possible to shorten the time required for obtaining the estimated value even when the distribution number is large. In this case, the management server 9 may transmit the determination number input from an administrator to the determination device 12.

Figure 33:
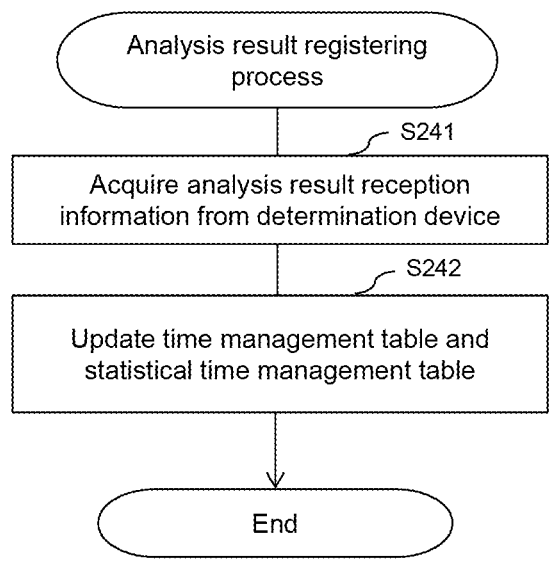
FIG. 33 illustrates an analysis result registering process of the management server 9.

FIG. 33 illustrates an analysis result registering process of the management server 9.

The management function 910 of the management server 9 having received the analysis result reception information from the determination device 12 according to the analysis result determining process performs an analysis result reception state registering process of registering the analysis result reception information in the time management table 923 and the statistical time management table 924. The analysis result reception information indicates the reception state of the analysis result information by the determination device 12 and includes the analysis server field 12203, the event class field 12204, and the like of the analysis result management table 720, for example.

The management function 910 receives analysis result reception information from the determination device 12 (step S241). Subsequently, the management function 910 registers information based on the analysis result reception information acquired in step S241 in the time management table 923 and the statistical time management table 924 (step S242).

Here, the management function 910 creates a record of the time management table 923 and registers the identification information, the event type, and the event class of the analysis server 11 included in the analysis result reception information in the analysis server field 9231, the event type field 9233, and the event class field 9234 of the record, respectively. Further, the management function 910 registers information indicating that these items of information have been received from the determination device 12 in the reception source field 9232. Further, the management function 910 registers the time at which the record is updated in the updated time field 9235 of the record.

Further, the management function 910 calculates a difference between the updated time (step S232 of the distribution destination registering process) of the record registered in the time management table 923 based on the distribution destination information and the updated time (step S242 of the analysis result registering process) of the record registered in the time management table 923 based on the corresponding analysis result reception information as a quotation time and registers the quotation time in the quotation time field 9235 of the record.

Further, the management function 910 calculates a new total time by adding the calculated quotation time to the total time of the record corresponding to the analysis logic of the analysis server 11 and the event type of the record in the statistical time management table 924 to update the total time field 9244 of the record. Further, the management function 910 calculates a new counter value by adding "1" to the counter value of the record to update the counter field 9245 of the record. Further, the management function 910 calculates an average quotation time by dividing the total time of the record by the counter value to update the average quotation time field 9242 of the record. The analysis result registering process is performed in this manner.

According to this process, the management server 9 can estimate the required time required until the analysis of an event is completed after the event is input to the analysis server 11 by communicating with the distribution device 10 and the determination device 12 without communicating with the analysis server 11. This time is used for selecting the realtime type distribution destination as the quotation time. Moreover, the management server 9 can suppress the load on the network by calculating the average of the quotation time and transmitting the average to the distribution device 10 without the need to transmit the queue state of each event to the distribution device 10. This average value is used for selecting the fixed time type distribution destination as the average quotation time.

According to the present embodiment, in a system in which logs generated due to an access of a client or the like are analyzed and an application uses the analysis result, by selecting a distribution destination determining method according to the requested time of the AP, it is possible to improve the efficiency of load balancing of the CEP technique and to improve the efficiency of an analysis system.

The AP server 13 may include an AP that requests an analysis result to be obtained within a short requested time and an AP that does not need to obtain an analysis result within such a short requested time. According to the embodiment, it is possible to execute analysis so as to satisfy the respective request from each of a plurality of applications by determining an event type corresponding to the requested time determined by an AP, selecting an analysis server that performs analysis server according to the event type, and distributing an analysis load. In the conventional method of load balancing to analysis servers, the load is not distributed by taking the requested time determined by the AP into consideration. Thus, it is difficult to distribute events efficiently according to an event type while satisfying the requested time.

Moreover, in the case of improving the processing performance of an analysis system according to the conventional scale-out method, the cost may increase with an increase in the number of analysis servers. In the present embodiment, the same analysis process is distributed to a plurality of analysis servers and is executed in parallel, and an estimated value is calculated from a plurality of analysis values. Thus, it is possible to improve the reliability of the estimated value even when the reliability of the analysis server 11 is low. Due to this, the analysis server 11 can use the hardware of a general personal computer (PC) and the analysis logic of open source software (OSS).

Therefore, the embodiment described above does not require a high-performance, expensive analysis server and thus can reduce the cost of analysis software components and reduce the cost of an analysis system.

According to the present embodiment, it is possible to replace some hardware or software components of the plurality of analysis servers 11 without stopping the analysis of an analysis system. Even when the reliability of some of the plurality of analysis servers 11 decreases due to this replacement, since the estimated value is calculated from a plurality of analysis values, it is possible to maintain the reliability of the estimated value. Due to this, it is possible to perform upgrade or the like of the analysis server 11 easily.

According to a conventional technique of migrating CEP being executed by a certain analysis server to a specific analysis server, it is necessary to suspend the analysis of the CEP during migration. On the other hand, according to the present embodiment, since the analysis of one event is distributed to a plurality of analysis servers 11, even when the analysis server 11 that performs analysis is changed, the other analysis server 11 continues the analysis and the estimated value is calculated from a plurality of analysis values. Thus, it is possible to prevent suspension of an analysis system.

[Second Embodiment]

In the first embodiment, a method in which the management server 9 predicts the queue state (that is, the load of the analysis server 11) of the analysis server 11 based on the time at which the distribution destination information is received from the distribution device 10 and the time at which the analysis result reception information is received from the determination device 12 has been described.

In a second embodiment, a method in which the management server 9 determines the queue state of the analysis server 11 by receiving information indicating the queue state from the analysis server 11 (that is, a method in which the management server 9 acquires the information indicating the load from the analysis server 11 and determines the load) will be described.

Hereinafter, a difference from the first embodiment will be described mainly.

Figure 34:
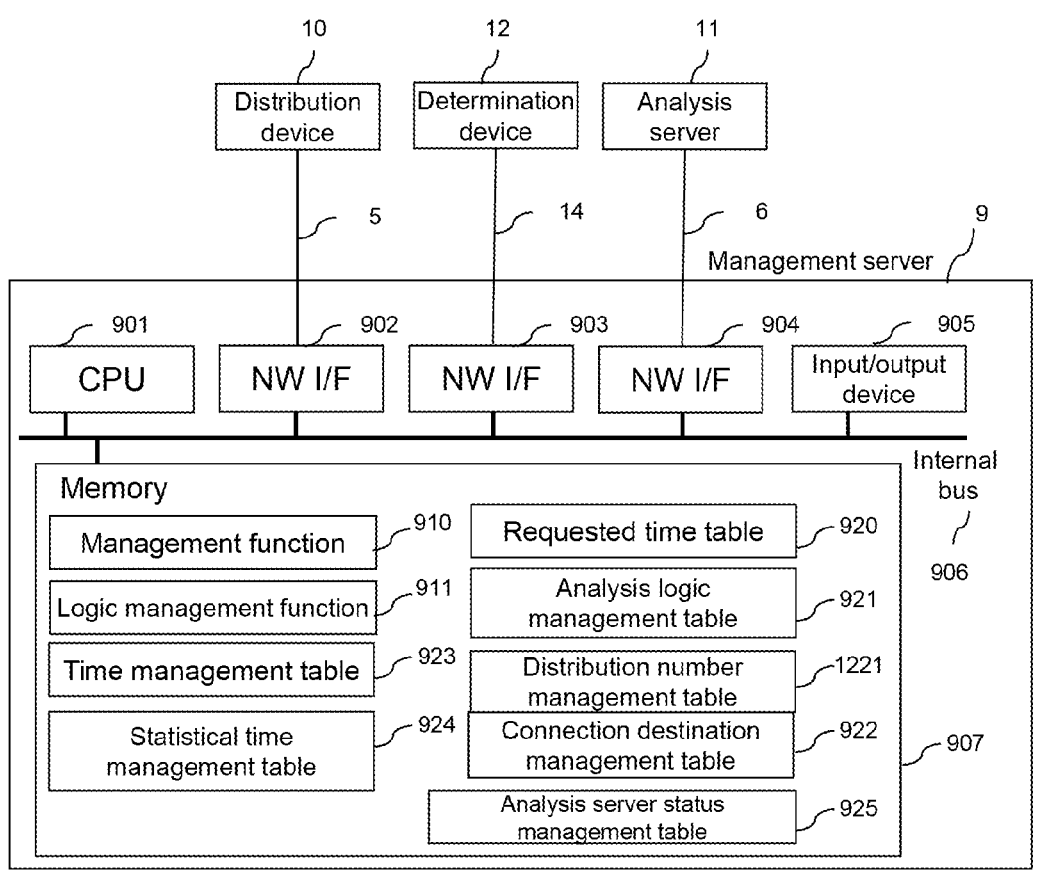
FIG. 34 illustrates a configuration of a management server 9 according to a second embodiment.

FIG. 34 illustrates a configuration of the management server 9 of the second embodiment.

As compared to the memory 907 of the management server 9 of the first embodiment, the memory 907 of the management server 9 of the present embodiment further stores an analysis server status management table 925. In the present embodiment, the time management table 923 may not be provided.

The management function 910 of the management server 9 transmits an inquiry on queue information to the analysis server 11. The analysis server 11 having received the inquiry transmits queue information indicating the queue state thereof to the management server 9. The management function 910 having received the queue information registers information based on the queue information in the analysis server status management table 925. The queue information includes a queue length (the number of standby events accumulated in the queue) of the analysis server 11, for example.

FIG. 35 illustrates the analysis server status management table 925 stored in the management server 9 of the second embodiment.

The analysis server status management table 925 has records for each analysis server 11. Each record includes an analysis server field 9251, a queue length field 9252, a quotation time field 9253, and an updated time field 9254.

The identification information of the analysis server 11 is registered in the analysis server field 9251. A queue length of the analysis server 11 is registered in the queue length field 9252. A quotation time (waiting time) required until the analysis of new events accumulated in the queue of the analysis server 11 is completed is registered in the quotation time field 9253. In other words, the quotation time is the sum of analysis time of events presently registered in the queue. The time at which the record is updated is registered in the updated time field 9254.

The management function 910 having received the queue information registers the identification information of the analysis server 11 that has transmitted the queue information, the queue length included in the queue information, and the received time of the queue information in the analysis server status management table 925. Further, the management function 910 calculates a quotation time by multiplying the analysis time in the analysis logic management table 921 by the queue length in the queue information received from the analysis server 11 and registers the calculated quotation time in the analysis server status management table 925.

In the first embodiment, the management server 9 acquires the distribution destination information and the analysis result reception information from the distribution device 10 and the determination device 12, respectively, which are disposed before and after the analysis server 11, predicts the queue state (that is, the load) of the respective analysis servers 11 based on the acquisition time of these items of information, and stores the prediction result as the quotation time in the time management table 923.

On the other hand, in the second embodiment, the management server 9 acquires the queue state (that is, the load information) by transmitting an inquiry to the analysis server 11 and stores the acquired result as the quotation time in the analysis server status management table 925. By using the quotation time in the analysis server status management table 925 instead of the quotation time in the time management table 923 of the first embodiment, it is possible to perform the same control as the first embodiment and to improve the accuracy of the control.

The distribution device 10 may acquire the queue length of the analysis server 11 via the management server 9 and store the acquired queue length in the distribution management table 121 to thereby determine the queue state of the analysis server 11 (that is, to acquire the load information). Further, the distribution device 10 may include an additional queue for events, store events in the queue of the distribution device 10 and determine a distribution destination so that the queue of the analysis server 11 does not exceed a predetermined amount based on the information on the queue length of the analysis server 11 when distributing fixed time type events, for example, to control transmission of events so that the load associated with the respective analysis server 11 does not exceed a predetermined amount based on the acquired load information, for example.

[Third Embodiment]

In a third embodiment, a series of events in a certain log output server 8 is analyzed by the same analysis server 11.

Hereinafter, a difference from the first embodiment will be described mainly.

Figure 36:
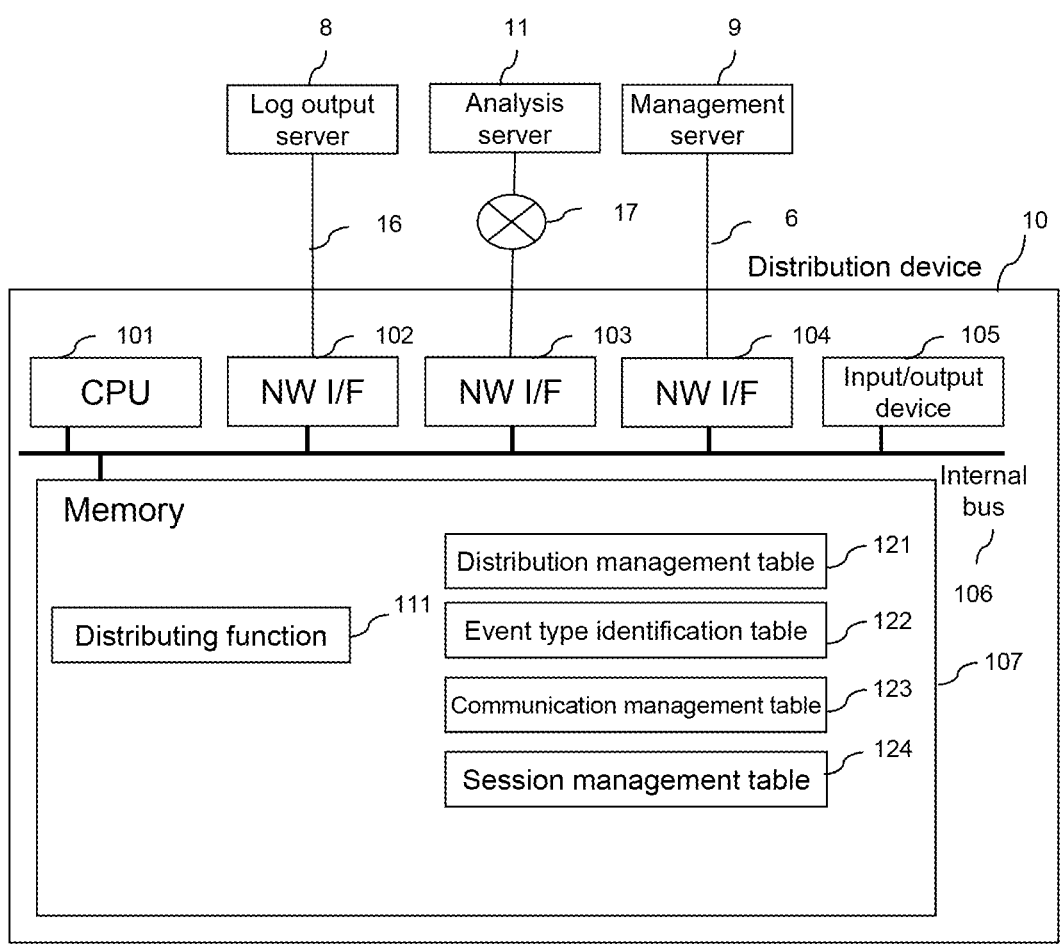
FIG. 36 illustrates a configuration of a distribution device 10 according to a third embodiment.

FIG. 36 illustrates a configuration of the distribution device 10 of the third embodiment.

As compared to the distribution device 10 of the first embodiment, the memory 107 of the distribution device 10 of the present embodiment further stores a session management table 124.

FIG. 37 illustrates the session management table 124 stored in the distribution device 10 of the third embodiment.

The session management table 124 illustrates association between the analysis server 11 and a session established between the client 7 and the log output server 8. The session management table 124 has records for each session. Each record includes a session ID field 1241, a distribution destination field 1242, an event type field 1243, and an event class field 1244.

Identification information of a session established between the client 7 and the log output server 8 is registered in the session ID field 1241. Identification information of the distribution destination analysis server 11 to which an event in the session is transmitted is registered in the distribution destination field 1242. An event type of the transmitted event is registered in the event type field 1243. An event class of the transmitted event is registered in the event class field 1244.

A session is one of the units of access and is a logical connection relationship for establishing communication between the client 7 and the log output server 8.

Figure 38:
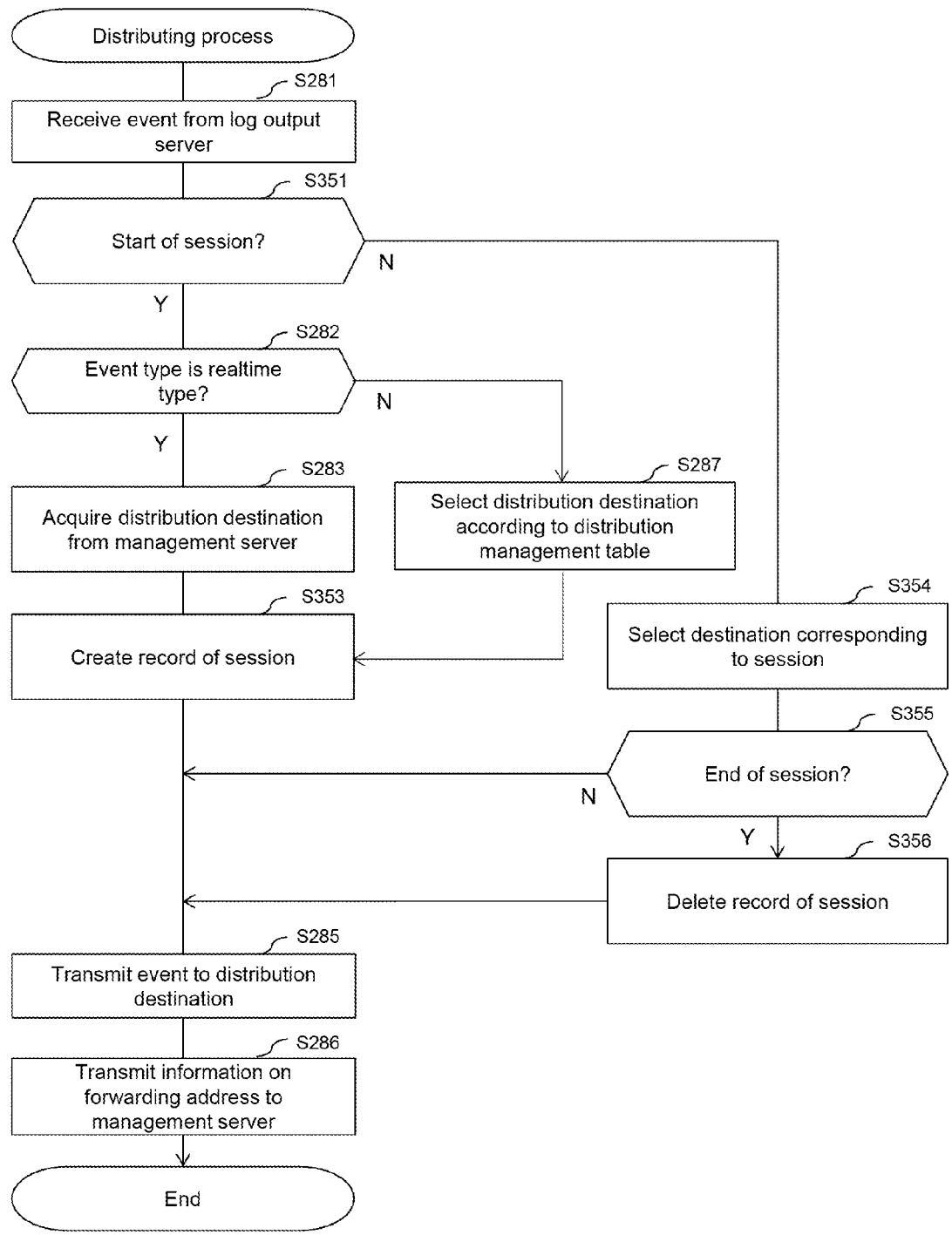
FIG. 38 illustrates a distributing process of the distribution device 10 of the third embodiment.

FIG. 38 illustrates a distributing process of the distribution device 10 of the third embodiment.

As compared to the distributing process of the first embodiment, the distributing process of the present embodiment includes steps S351 to S356 instead of step S283.

Subsequently to step S281, the distributing function 111 of the distribution device 10 determines whether the received event involves the start of a new session (step S351). Here, an event that involves the start of a session may include information indicating the start of a session. In this case, the distributing function 111 may determine whether the received event includes information indicating the start of a new session. Moreover, the distributing function 111 may determine whether a record of a session corresponding to the event type and the event class of the received event is present in the session management table 124.

When it is determined that the received event involves the start of a new session (step S351: Y), the distributing function 111 determines whether the event type of the event is a realtime type by the same step S282 as the first embodiment. When it is determined that the event type is a realtime type, the distributing function 111 acquires the distribution destination from the management server 9 by the same step S283 as the first embodiment and proceeds to step S353. When it is determined that the event type is not the realtime type (but the fixed time type), the distributing function 111 determines the distribution destination based on the distribution management table 121 by the same step S287 as the first embodiment and proceeds to step S353. After that, the distributing function 111 creates a record of the started session in the session management table 124 (step S353) and proceeds to the same step S285 as the first embodiment.

When it is determined that the received event does not involve the start of a new session (step S351: N), the distributing function 111 selects a record of a session corresponding to the received event in the session management table 124 and selects the distribution destination analysis server 11 corresponding to the record as the distribution destination (step S354). Here, the distributing function 111 selects a record of which the event type and the event class included in the event type field 1243 and the event class field 1244 of the session management table 124 match those of the received event. After that, the distributing function 111 selects the distribution destination analysis server 11 included in the distribution destination field 1242 of the selected record in the session management table 124.

After that, the distributing function 111 determines whether the received event involves the end of a session (S355). Here, the event that involves the end of a session may include information indicating the end of a session. In this case, the distributing function 111 may determine whether the received event includes information indicating the end of a new session.

When it is determined that the received event does not involve the end of a session (step S355: N), the distributing function 111 proceeds to step S285.

When it is determined that the received event involves the end of a session (step S355: Y), the distributing function 111 deletes the record of the selected session in the session management table 124 and proceeds to the same step S285 as the first embodiment. The subsequent processes are the same as those of the first embodiment. The distributing process of the present embodiment is performed in this manner.

The distributing function 111 may transmit events in other series of operations such as transactions instead of sessions to the same distribution destination.

According to the present embodiment, the analysis server 11 can analyze a series of events. For example, when a certain event is related to an event continuous to the event in the log output server 8, the distribution device 10 transmits these events to the same analysis server 11. By doing so, the analysis server 11 can perform analysis using these events. Due to this, it is possible to execute load balancing appropriately when analyzing a change in values associated with a plurality of events and when analyzing a series of operations of a certain client 7, for example. For example, the present embodiment can be employed when analyzing a change in a certain stock price and when analyzing a series of operations of the client 7.

The present invention is not limited to the embodiments described above but can be modified in various other forms without departing from the spirit of the present invention.

REFERENCE SIGNS LIST

5, 6, 14, 15, 16, 17, 18, 19 Network
7 Client
8 Log output server
9 Management server
10 Distribution device
11 Analysis server
12 Determination device
13 AP server

The invention claimed is:

1. A processing control system comprising:
a distribution device communicatively coupled to a plurality of n processing devices, wherein n is greater than or equal to 3;
a processing result determination device communicatively coupled to the plurality of n processing devices and
a management device communicatively coupled to the distribution device, wherein:
each of the plurality of n processing devices is configured to:
process processing target information to calculate a processing result and
transmit the processing result to the processing result determination device;
the management device is configured to:
acquire time information indicating the time required in processing of processing target information on each of the plurality of n processing devices,
estimate a required time required for each of the plurality of n processing devices to process the processing target information based on the time information to obtain an estimated time, and
transmit estimated time information indicating a relationship between the estimated time and each of the n processing devices to the distribution device; and
the distribution device is configured to:
determine m processing devices from the plurality of n processing devices for processing a series of pieces of processing target information as m designated processing devices, based on the estimated time information and the series of pieces of processing target information including the processing target information used for the estimation, and transmit the series of pieces of processing target information to the m designated processing devices; and the processing result determination device is configured to:

receive m processing results from the m designated processing devices respectively, estimate a true value as an estimated value from the m processing results according to a predetermined method, and transmit the estimated value to other processing device from the m designated processing devices.

2. The processing control system according to claim 1, wherein:

an upper limit of the estimated time is determined in advance for the processing target information, the management device is further configured to transmit the estimated time information to the distribution device, and the distribution device is further configured to determine the m designated processing devices among processing devices satisfying the upper limit based on estimated time information.

3. The processing control system according to claim 1, wherein the processing result determination device is further configured to count a number of times of receiving each particular processing results and select the estimated value from among the m processing results based on the number of times of receiving each particular processing results.

4. The processing control system according to claim 3, wherein:

the management device is further configured to transmit m indicating a number of the m processing devices to the processing result determination device, and the processing result determination device is further configured to, select the estimated value when the number of times of receiving the particular processing result exceeds a half of m, and transmit the estimated value to the processing device.

5. The processing control system according to claim 1, wherein the management device is further configured to:

store required time information on past required time based on the time information, calculate an average value of the past required time based on the required time information to obtain the estimated time, and using the estimated time for the determination of the m designated processing devices.

6. The processing control system according to claim 5, wherein:

the management device is further configured to transmit to the distribution device the estimated time information indicating the estimated time of each of the n processing devices and m indicating a number of the m processing devices, and the distribution device is further configured to select the m designated processing devices in ascending order of the estimated time among the n processing devices.

7. The processing control system according to claim 1, wherein:

the distribution device is further configured to transmit an inquiry about the estimated time information to the management device, and the management device is further configured, upon receiving the inquiry, to:

select the m designated processing devices in ascending order of the estimated time among the n processing devices and transmit the estimated time information indicating the m designated processing device to the distribution device.

8. The processing control system according to claim 1, wherein the management device is further configured to;

receive queue information indicating a state of queue of each of the n processing devices from the n processing devices and estimate the estimated time based on the queue information.

9. The method according to claim 8, further comprising:

determining, by the management device, in advance an upper limit of the estimated time for the processing target information; and determining, by the management device, the m designated processing devices among processing devices satisfying the upper limit based on estimated time information.

10. The method according to claim 8, further comprising:

selecting, by the management device, the estimated value based on a count of a number of a particular processing result from among the m processing results.

11. The processing method according to claim 10, further comprising:

selecting, by the management device, the particular processing result as the estimated value, when a count of a number of the particular processing results exceeds half of m.

12. A load balancing method for a computer system, the method comprising:

acquiring, by a management device, time information indicating an amount of time required in processing of processing target information on each of a plurality of n processing devices, wherein n is greater than or equal to 3;

estimating, by the management device, a required time required for each of the plurality of n processing devices to process the processing target information based on the time information to obtain an estimated time;

determining, by a distribution device communicatively coupled to the management device, m processing devices from the plurality of n processing devices for processing a series of pieces of processing target information as m designated processing devices based on the estimated time and the series of pieces of processing target information including the processing target information used for the estimation;

transmitting, by the distribution device, the series of pieces of processing target information to the m designated processing devices;

processing, by each of the m designated processing devices, target information to generate a processing result and transmitting, by each of the m designated processing devices, the processing result to a processing result determination device, wherein the processing result determination device is communicatively coupled to a plurality of n processing devices;

receiving, by the processing result determination device, m processing results from the m designated processing devices respectively;

estimating, by the processing result determination device, a true value as the estimated value from the m processing results according to a predetermined method; and transmitting, by the processing result determination device, the estimated value to other processing device from the m designated processing devices.

13. The processing control system according to claim 1, wherein the series of pieces of processing target information belongs to a session, and the processing target information used for the estimation is information indicating a start of the session.

14. The method according to claim 12, wherein the series of pieces of processing target information belongs to a session, and the processing target information used for the estimation is information indicating a start of the session.

15. The method according to claim 12, further comprising:

storing, by the management device, required time information on past required time based on the time information; and calculating, by the management device, an average value of the past required time based on the required time information to obtain the estimated time, and determining, the management device, the m designated processing devices based on the estimated time.

16. The method according to claim 15, further comprising:

transmitting, by the management device, estimated time information indicating the estimated time of each of the n processing devices and m indicating a number of the m processing devices; and selecting, by the management device the m designated processing devices in ascending order of the estimated time among the n processing devices.

17. The method according to claim 12, further comprising:

transmitting, by the management device an inquiry about the required time; and upon receiving the inquiry, selecting, by the management device, the m designated processing devices in ascending order of the estimated time among the n processing devices and transmitting, by the management device, the estimated time.

18. The processing method according to claim 12, further comprising:

receiving, by the management device, queue information indicating a state of queue of each of the n processing devices from the n processing devices; and estimating, by the management device, the estimated time based on the queue information.

* * * * *